(12) United States Patent
Kim et al.

(10) Patent No.: US 10,545,830 B2
(45) Date of Patent: Jan. 28, 2020

(54) STORAGE DEVICE FOR PROCESSING CORRUPTED METADATA AND METHOD OF OPERATING THE SAME

(71) Applicant: SAMSUNG ELECTRONICS CO., LTD., Suwon-si, Gyeonggi-Do (KR)

(72) Inventors: Jong-Won Kim, Seoul (KR); Dong-Young Seo, Suwon-si (KR); Dong-Gun Kim, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 209 days.

(21) Appl. No.: 15/850,915

(22) Filed: Dec. 21, 2017

(65) Prior Publication Data

US 2018/0225176 A1 Aug. 9, 2018

(30) Foreign Application Priority Data

Feb. 6, 2017 (KR) .......................... 10-2017-0016266

(51) Int. Cl.
| G06F 12/00 | (2006.01) |
| G06F 11/14 | (2006.01) |
| G06F 3/06 | (2006.01) |
| G06F 12/16 | (2006.01) |
| G06F 11/07 | (2006.01) |

(52) U.S. Cl.
CPC .......... *G06F 11/1435* (2013.01); *G06F 3/068* (2013.01); *G06F 11/1448* (2013.01); *G06F 11/1469* (2013.01); *G06F 12/16* (2013.01); *G06F 11/073* (2013.01); *G06F 11/0769* (2013.01)

(58) Field of Classification Search
CPC .. G06F 11/1435; G06F 11/0769; G06F 3/068; G06F 11/1469; G06F 11/1448; G06F 12/16; G06F 11/073
USPC .................................................. 711/162, 154
See application file for complete search history.

(56) References Cited

U.S. PATENT DOCUMENTS 8,281,227 B2 * 10/2012 Thatcher ............... G06F 11/073
714/770
8,924,832 B1 * 12/2014 Lam ........................ G06F 12/06
702/117

(Continued)

FOREIGN PATENT DOCUMENTS

KR  10-1548452  8/2015

*Primary Examiner* — Mardochee Chery
(74) *Attorney, Agent, or Firm* — F. Chau & Associates, LLC

(57) ABSTRACT

A method of operating a storage device includes receiving a first logical address from a host, determining whether first metadata stored in a volatile memory of the storage device and associated with the first logical address is corrupted, processing the first metadata as an uncorrectable error when the first metadata is determined to be corrupted, providing an error message to the host indicating that an operation cannot be performed on data associated with the first logical address when the first metadata is processed as the uncorrectable error, after the providing of the error message, receiving a second logical address from the host, determining whether second metadata stored in the volatile memory and associated with the second logical address is corrupted, and performing an operation of accessing the non-volatile memory based on the second metadata, when the second metadata is not determined to be corrupted.

20 Claims, 36 Drawing Sheets

(56) References Cited

U.S. PATENT DOCUMENTS

| | | | |
|---|---|---|---|
| 8,990,670 B2 | 3/2015 | Ozdemir et al. | |
| 9,116,823 B2* | 8/2015 | Fillingim | G06F 11/1044 |
| 9,197,247 B2 | 11/2015 | Kim et al. | |
| 9,286,198 B2 | 3/2016 | Bennett | |
| 9,292,434 B2 | 3/2016 | Huang | |
| 9,298,578 B2 | 3/2016 | Kang et al. | |
| 9,495,241 B2* | 11/2016 | Flynn | G06F 12/0253 |
| 2010/0293439 A1* | 11/2010 | Flynn | G06F 11/073 |
| | | | 714/763 |
| 2015/0234707 A1 | 8/2015 | Vogelsang et al. | |
| 2016/0042810 A1 | 2/2016 | Lee et al. | |
| 2016/0110125 A1* | 4/2016 | Orme | G06F 12/0238 |
| | | | 711/102 |
| 2016/0188412 A1 | 6/2016 | Coronado et al. | |
| 2019/0102251 A1* | 4/2019 | Iyigun | G06F 11/1068 |

\* cited by examiner

STORAGE DEVICE FOR PROCESSING CORRUPTED METADATA AND METHOD OF OPERATING THE SAME

CROSS-REFERENCE TO RELATED APPLICATION

This application claims priority to and the benefit of Korean Patent Application No. 10-2017-0016266, filed on Feb. 6, 2017, in the Korean Intellectual Property Office, the disclosure of which is incorporated by reference in its entirety herein.

BACKGROUND

1. Technical Field

The inventive concept relates to a storage device, and more particularly, to a storage device for processing corrupted metadata and a method of operating the storage device.

2. Discussion of Related Art

Non-volatile memory is a type of memory that can retrieve stored information even when power is no longer supplied. Flash memory is an example of a non-volatile memory. Storage devices including flash memory, such as a solid state drive (SSD) and a memory card, have been widely used. Storage devices are useful for storing or moving a large amount of data. The storage capacity of storage devices has greatly increased. A storage device may store data using metadata. However, the storage device cannot operate normally when even a small amount of the metadata is corrupted.

SUMMARY

According to an exemplary embodiment of the inventive concept, there is provided a method of operating a storage device including a non-volatile memory and a volatile memory. The method includes: receiving a first logical address from a host, determining whether first metadata stored in the volatile memory and associated with the first logical address is corrupted, processing the first metadata as an uncorrectable error when the first metadata is determined to be corrupted, providing an error message to the host indicating that an operation cannot be performed on data associated with the first logical address when the first metadata is processed as the uncorrectable error, after the providing of the error message, receiving a second logical address from the host, determining whether second metadata stored in the volatile memory and associated with the second logical address is corrupted, and performing an operation of accessing the non-volatile memory based on the second metadata, when the second metadata is not determined to be corrupted.

According to an exemplary embodiment of the inventive concept, there is provided a method of operating a storage device including a non-volatile memory and a volatile memory. The method includes: loading a directory stored in the non-volatile memory to the volatile memory when power is supplied to the storage device, wherein the directory includes a plurality of directory data indicating physical addresses respectively corresponding to a plurality of metadata, determining whether the plurality of directory data is corrupted in the directory loaded to the volatile memory, determining whether first directory data among the plurality of directory data determined to be corrupted is recoverable, processing first metadata corresponding to the first directory data as an uncorrectable error when the first directory data is corrupted and not recoverable, and loading second metadata corresponding to second directory data from the non-volatile memory to the volatile memory, wherein the second directory data is not corrupted among the plurality of directory data.

According to an exemplary embodiment of the inventive concept, there is provided a storage device including a non-volatile memory and a controller including a volatile memory configured to store first metadata associated with a first logical address and second metadata associated with a second logical address. When the controller receive the first logical address from a host, the controller is configured to determine whether the first metadata is corrupted and process the first metadata as an uncorrectable error if the first metadata is corrupted. Then, when the controller receives the second logical address from the host, the controller is configured to determine whether the second metadata is corrupted and control an operation of accessing the non-volatile memory based on the second metadata if the second metadata is not corrupted.

According to an exemplary embodiment of the inventive concept, there is provided a storage device including a non-volatile memory and a controller including a volatile memory configured to store original metadata associated with a logical address. The controller is configured to receive the logical address from a host, determine whether backup metadata exists when the original metadata is corrupted, wherein the backup metadata is a copy of the original metadata before it became corrupted, access the non-volatile memory based on the backup metadata when the backup metadata exists, and process the original metadata as an uncorrectable error when the backup metadata does not exist.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EXEMPLARY EMBODIMENTS

Figure 1:
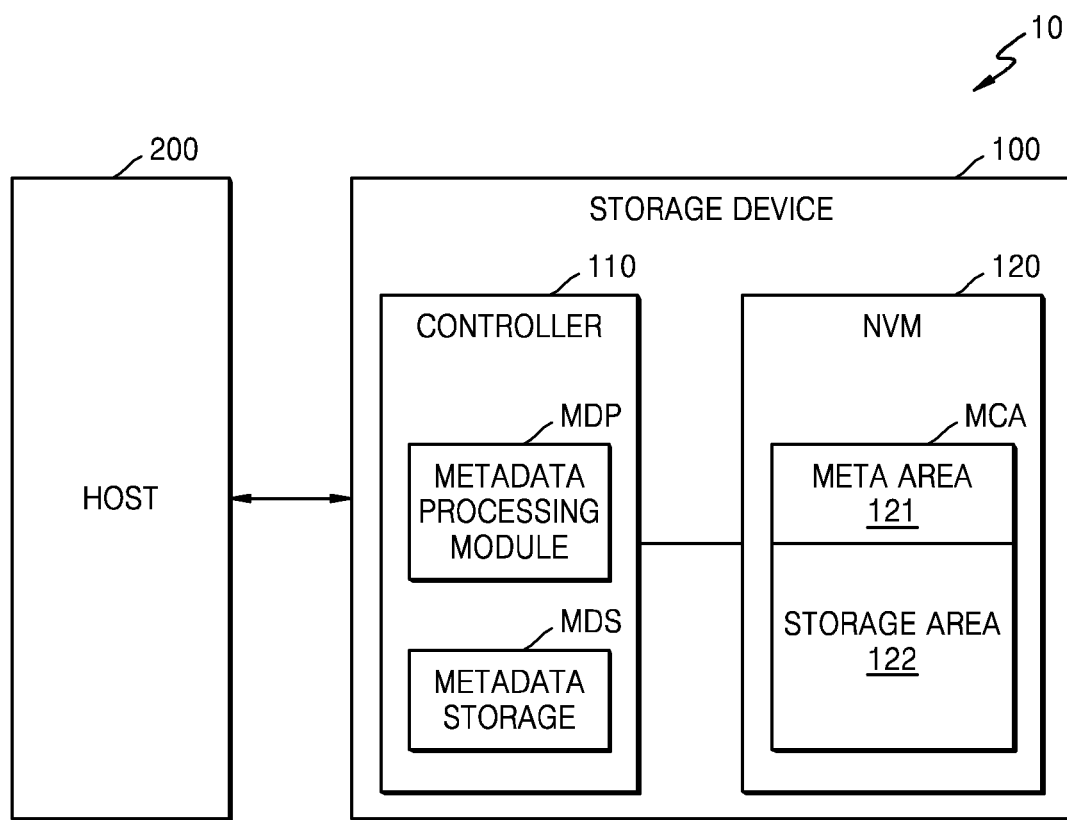
FIG. 1 is a block diagram of a storage system according to an exemplary embodiment of the inventive concept.

FIG. 1 is a block diagram of a storage system 10 according to an exemplary embodiment of the inventive concept.

Referring to FIG. 1, the storage system 10 includes a storage device 100 and a host 200. The storage device 100 includes a controller 110 and a non-volatile memory (NVM) 120. The controller 110 may control the NVM 120 in response to a write/read request from the host 200 so that data is read from the NVM 120 or data is written to the NVM 120. The host 200 may communicate with the storage device 100 through various types of interfaces and may transmit a write/read request to the storage device 100. The host 200 may be implemented by an application processor (AP) or a system-on-chip (SoC).

The NVM 120 may include a memory cell array MCA. The memory cell array MCA includes a meta area 121 storing metadata and a storage area 122 storing user data. The memory cell array MCA may include flash memory cells, which may be NAND flash memory cells. However, the inventive concept is not limited thereto. For example, the memory cells may be resistive memory cells such as resistive random access memory (ReRAM) cells, phase-change RAM (PRAM) cells, or magnetic RAM (MRAM) cells.

In an exemplary embodiment, the metadata includes at least one element selected from among mapping data indicating mapping information between a logical address of the host 200 and a physical address of the NVM 120, physical block information indicating information about pages included in each physical block of the NVM 120, trim data indicating data erased from the host 200, and a directory indicating a physical address at which the metadata such as mapping data or physical block information is stored in the meta area 121 of the NVM 120. When power is supplied to the storage device 100, for example, when the storage system 10 is booted, metadata stored in the meta area 121 of the NVM 120 may be loaded to the controller 110.

The controller 110 includes a metadata processing module MDP and a metadata storage MDS. Metadata stored in the meta area 121 is loaded to the metadata storage MDS. In an exemplary embodiment, the metadata storage MDS is implemented as a volatile memory such as dynamic RAM (DRAM) or static RAM (SRAM). Although the metadata storage MDS is included in the controller 110 in the embodiment illustrated in FIG. 1, the inventive concept is not limited thereto. For example, the metadata storage MDS may be implemented as a volatile memory located outside the controller 110.

In an embodiment, the metadata processing module MDP processes metadata loaded to the metadata storage MDS according to whether the loaded metadata is corrupted or not corrupted. In an embodiment, the metadata processing module MDP determines whether metadata is corrupted and processes the corrupted metadata as an uncorrectable error. For example, the metadata processing module MDP determines whether the corrupted metadata can be recovered and processes the metadata that cannot be recovered as an uncorrectable error. The uncorrectable error may correspond to an uncorrectable error correction code (UECC) error.

When the storage device 100 receives a logical address and a read request from the host 200 and metadata related to the logical address is corrupted, the storage device 100 may provide an error message to the host 200 indicating that reading is impossible with respect to the read request. For example, the storage device 100 may provide an error message to the host 200 indicating that an operation (e.g., a read of the read request) associated with the logical address cannot be performed. Thereafter, when the storage device 100 receives a read request with respect to another logical address, the storage device 100 performs a read operation normally according to the read request to access read data and provides the read data to the host 200. When the storage device 100 receives a write request with respect to another logical address, the storage device 100 performs a write operation normally according to the write request. Accordingly, when metadata having a small size is corrupted, the storage device 100 continues to perform normal operations, except with respect to the corrupted metadata.

The storage system 10 may be implemented as a personal computer (PC), a data server, a network-attached storage (NAS), an internet-of-things (IoT) device, or a portable electronic device. The portable electronic device may be a laptop computer, a cellular phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, or a wearable device.

The storage device 100 may be an internal memory embedded in an electronic device. For example, the storage device 100 may be a solid state drive (SSD), an embedded universal flash storage (UFS) device, or an embedded multimedia card (eMMC). Alternatively, the storage device 100 may be an external memory detachable from an electronic device. For example, the storage device 100 may be a UFS card, a compact flash (CF) card, a secure digital (SD) card, a micro-SD card, a mini-SD card, an extreme digital (xD) card, or a memory stick.

Figure 2:
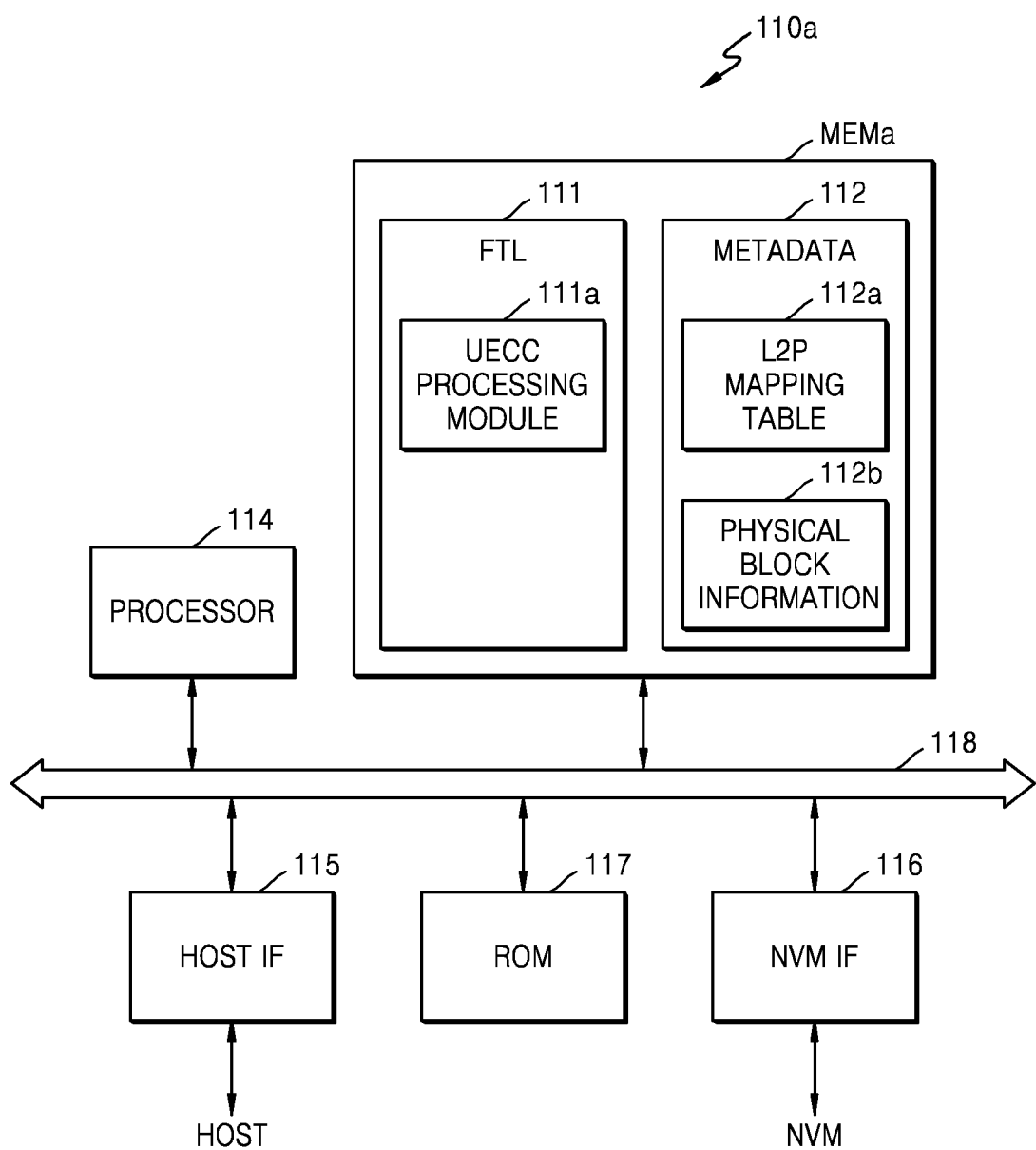
FIG. 2 is a block diagram of an example of a controller illustrated in FIG. 1.

FIG. 2 is a block diagram of an example 110a of the controller 110 illustrated in FIG. 1.

Referring to FIG. 2, the controller 110a includes a memory MEMa, a processor 114, a host interface (IF) 115, an NVM IF 116, and a read-only memory (ROM) 117, which may communicate with one another via a bus 118. The processor 114 may include a central processing unit (CPU) or a microprocessor and may control all operations of the controller 110a. The memory MEMa may operate according to the control of the processor 114 and may be used as a working memory, a buffer memory, or a cache memory. The memory MEMa may be implemented as a volatile memory, such as a DRAM or an SRAM, or an NVM, such as a PRAM or a flash memory. The memory MEMa is implemented as a volatile memory (e.g., DRAM) in the embodiments described below. Accordingly, DRAM may refer to a memory to which metadata is loaded.

The metadata processing module MDP shown in FIG. 1 may be implemented by software or firmware and may be loaded to the memory MEMa. The metadata processing module MDP may be implemented as a flash translation layer (FTL) 111 and may be loaded to the memory MEMa. However, the inventive concept is not limited thereto. For example, the metadata processing module MDP may be implemented by hardware. In an embodiment, the metadata storage MDS shown in FIG. 1 corresponds to the metadata area 112 which is part of the memory MEMa. In an embodiment, the FTL 111 and the metadata area 112 are formed on one chip. However, the inventive concept is not limited thereto. For example, the FTL 111 and the metadata area 112 may be formed on different chips.

The FTL 111 may include a UECC processing module 111a. When metadata loaded to the metadata area 112 is corrupted and unrecoverable, the UECC processing module 111a may process the metadata as a UECC error (i.e., an uncorrectable error). In an embodiment, during UECC processing, the UECC processing module 111a updates a mapping table by changing a physical address of metadata into a new physical address. The FTL 111 may also include an address mapping module, a wear-leveling module, a bad block management module, a garbage collection module, or an encryption/decryption module according to a function implemented by firmware.

In an embodiment, the metadata area 112 includes a logical-to-physical (L2P) mapping table area 112a and a physical block information area 112b. In an embodiment, the L2P mapping table area 112a stores a mapping table including a plurality of mapping data used to translate a logical address into a physical address. In an embodiment, the physical block information area 112b stores physical block information indicating information about pages included in a physical block. Mapping data and physical block information will be described with reference to FIGS. 3A and 3B later.

The host IF 115 provides an interface between the host 200 and the controller 110a. The host IF 115 may provide an interface according to a universal serial bus (USB), an MMC, peripheral component interconnect express (PCI-E), advanced technology attachment (ATA), serial ATA (SATA), parallel ATA (PATA), small computer system interface (SCSI), serial attached SCSI (SAS), enhanced small disk interface (ESDI), or integrated drive electronics (IDE). The NVM IF 116 provides an interface between the controller 110a and the NVM 120. For example, an L2P mapping table, block information, write data, and read data may be transmitted between the controller 110a and the NVM 120 through the NVM IF 116. The ROM 117 may store code data (e.g., executable instructions) necessary for an initial booting of the storage device 100.

Figure 3A:
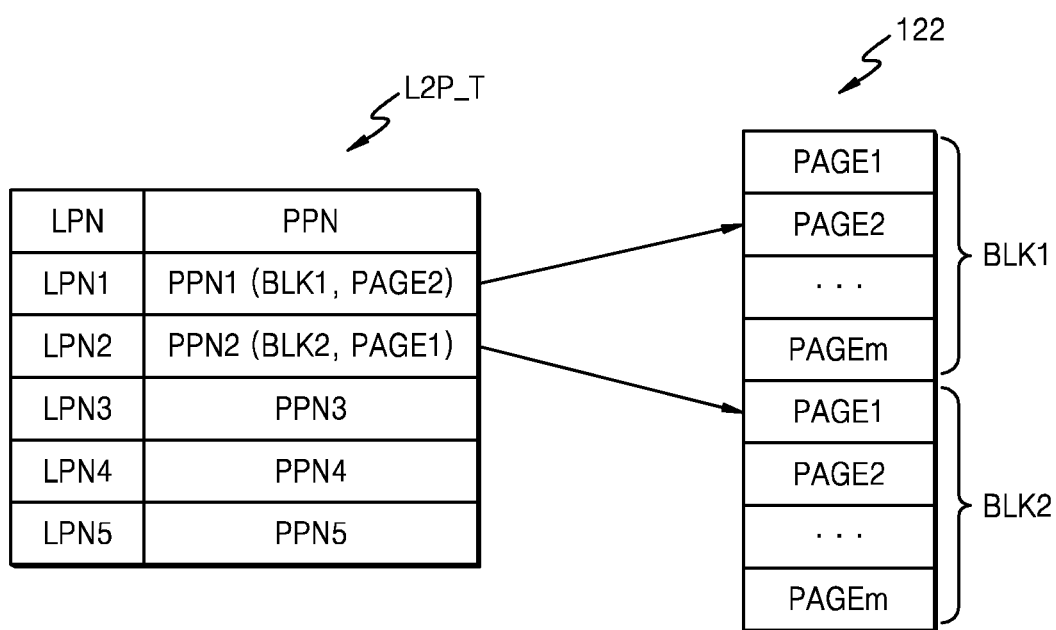
FIG. 3A is a diagram of a logical-to-physical (L2P) mapping table according to an exemplary embodiment of the inventive concept.

FIG. 3A is a diagram of an L2P mapping table L2P_T according to an exemplary embodiment of the inventive concept. The L2P mapping table L2P_T may be loaded to the L2P mapping table area 112a shown in FIG. 2. Referring to FIGS. 1 through 3A, the L2P mapping table L2P_T includes a plurality of mapping data. Each mapping data indicates a physical page number (PPN) corresponding to a logical page number (LPN). For example, a second physical address corresponding to a second logical address LPN2 is PPN2, which may be a first page PAGE1 of a second block BLK2 included in the storage area 122 of the NVM 120. The L2P mapping table L2P_T may include a plurality of rows, where each row maps a logical address (e.g., a logical page address) to a physical address (e.g., a physical page address), and the physical address identifies the location of a selected block within the storage area 122 and a location of a page within the selected block. In an embodiment, the logical addresses are omitted from the L2P mapping table L2P_T and the position of each row is used to infer its logical address.

Figure 3B:
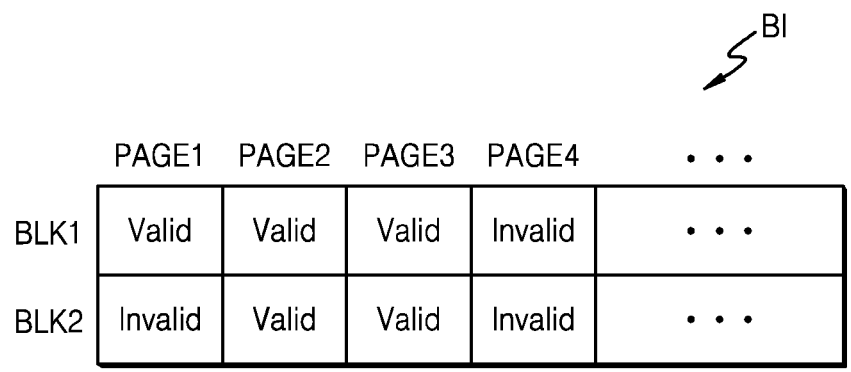
FIG. 3B is a diagram of physical block information according to an exemplary embodiment of the inventive concept.

FIG. 3B is a diagram of physical block information BI according to an exemplary embodiment of the inventive concept. The physical block information BI may be loaded to the physical block information area 112b shown in FIG. 2. Referring to FIGS. 1 through 3B, the physical block information BI indicates a state of each of a plurality of pages PAGE1 through PAGEm included in each of the first and second blocks BLK1 and BLK2 as valid or invalid. For example, the first and fourth pages PAGE1 and PAGE4 included in the second block BLK2 are illustrated as being invalid and the second and third pages PAGE2 and PAGE3 are illustrated as being valid. The physical block information BI may also store a valid page count indicating the number of valid pages included in each of the first and second blocks BLK1 and BLK2.

Figure 4:
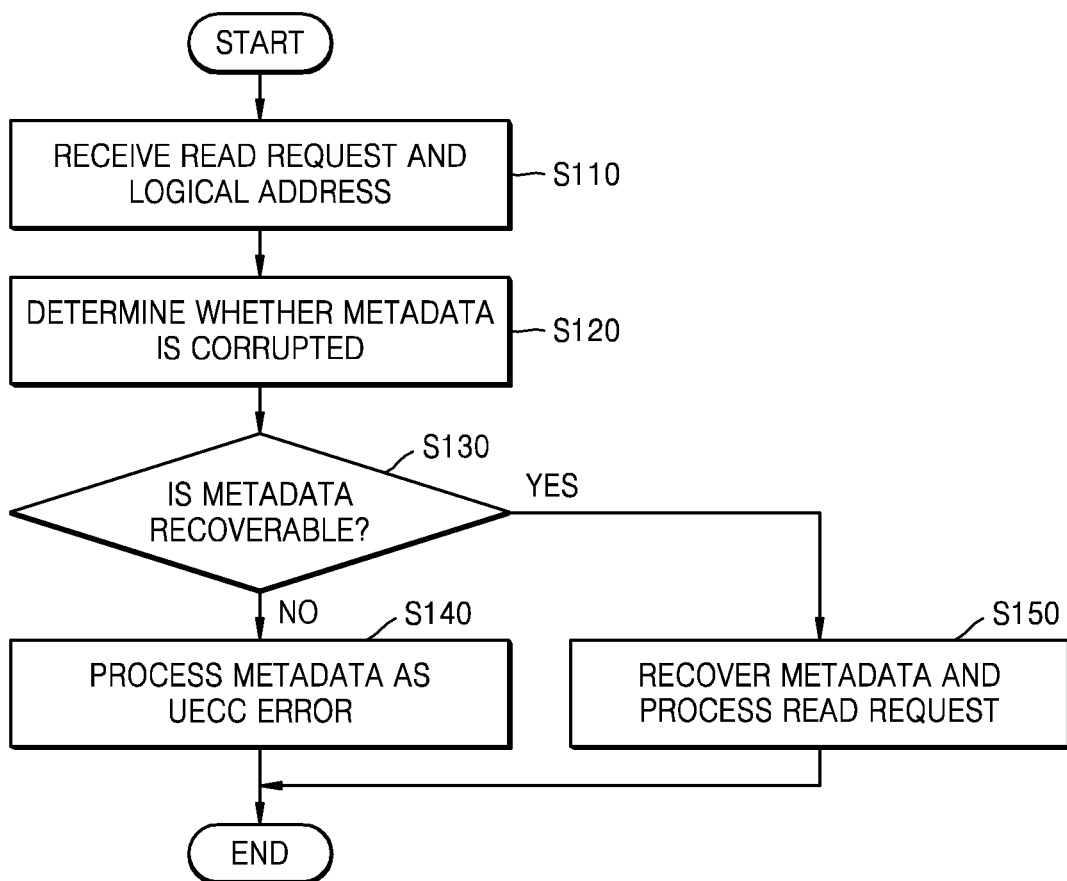
FIG. 4 is a flowchart of a method of operating a storage device, according to an exemplary embodiment of the inventive concept.

FIG. 4 is a flowchart of a method of operating a storage device according to an exemplary embodiment of the inventive concept.

Referring to FIG. 4, the method of operating a storage device relates to a method of processing unrecoverable metadata when a read request is received from a host and may include operations time-sequentially performed in, for example, the storage device 100 shown in FIG. 1. The method of operating a storage device will be described with reference to FIGS. 1 through 4 below.

The storage device 100 receives a read request and a logical address from the host 200 in operation S110. The storage device 100 determines whether metadata is corrupted in operation S120. In an embodiment, the storage device 100 determines whether mapping data indicating a physical address corresponding to the logical address among the metadata loaded to a volatile memory is corrupted. For example, the UECC processing module 111a included in the controller 110a may determine whether mapping data loaded to the L2P mapping table area 112a is corrupted based on the physical block information BI loaded to the physical block information area 112b.

Whether the metadata is recoverable is determined in operation S130. In an embodiment, the UECC processing module 111a determines whether backup data of the metadata exists and determines that the metadata is recoverable when the backup data exists. When it is determined that the metadata is unrecoverable, operation S140 is performed. When it is determined that the metadata is recoverable, operation S150 is performed. The metadata is processed as a UECC error in operation S140. For example, the UECC processing module 111a may process the metadata as a UECC error and provide an error message indicating that reading is impossible with respect to the read request to the host 200. The error message may indicate that a read operation associated with the logical address cannot be performed. The metadata is recovered and the read request is processed in operation S150. The processing of the read request may include determining a physical address corresponding to the logical address using the backup data. Corrupted metadata found within the L2P mapping table L2P_T may be replaced with the backup data.

Although not shown, the storage device 100 may receive a read request or a write request and another logical address from the host 200 afterwards. At this time, the storage device 100 may determine whether mapping data indicating a physical address corresponding to the current logical address is corrupted. When it is determined that the mapping data is not corrupted or is recoverable, the storage device 100 performs a read operation normally according to the read request or a write operation according to the write request.

Figure 5:
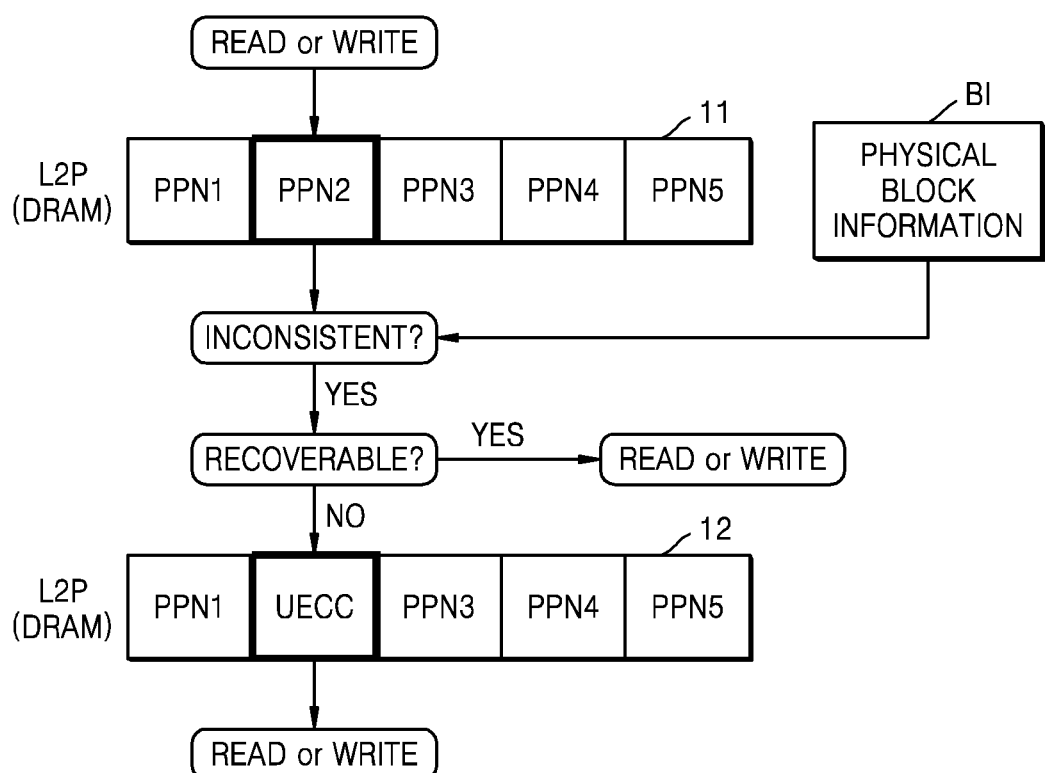
FIG. 5 is a diagram of an operation of processing unrecoverable metadata, according to an exemplary embodiment of the inventive concept.

FIG. 5 is a diagram of an operation of processing unrecoverable metadata according to an exemplary embodiment of the inventive concept.

Referring to FIGS. 2 and 5, the controller 110a receives a read or write request and a logical address from a host. In an embodiment, the first mapping information 11 illustrated in FIG. 5 corresponds to the L2P mapping table L2P_T shown in FIG. 3 and the physical block information BI illustrated in FIG. 5 corresponds to the physical block information BI shown in FIG. 3B. When the logical address is LPN2, a physical address mapped to LPN2 is PPN2.

In an embodiment, the UECC processing module 111a checks whether the PPN2 is valid or invalid by checking the physical block information BI and determines whether mapping data corresponding to the PPN2 is corrupted. For example, when the first page PAGE1 of the second block BLK2, which corresponds to the PPN2, is invalid, as shown in FIG. 3B, the UECC processing module 111a determines that the mapping data associated with the logical address is corrupted.

However, the inventive concept is not limited thereto. In an embodiment, when the PPN2 does not indicate a real physical address, the UECC processing module 111a determines that the mapping data corresponding to the PPN2 is corrupted without checking the physical block information BI. For example, when an NVM includes first through hundredth blocks and the PPN2 indicates a page included in a hundred and first block, it may be determined that the mapping data corresponding to the PPN2 is corrupted. For example, the controller 110a may store a count of the number of blocks available and when a physical address associated with mapping data indicates a block number exceeding the count, it can be concluded that the mapping data is corrupted.

Further, in an exemplary embodiment, the UECC processing module 111a determines whether the PPN2 is valid or invalid by checking a logical address, which is stored in the NVM 120 and indicated by the PPN2. In an embodiment, a spare area in a page indicated by the PPN2 in the storage area 122 stores a logical address (e.g., an LPN) corresponding to the PPN2. When a logical address corresponding to the PPN2 is the LPN2 according to the first mapping information 11 while a logical address stored in a spare area of a physical address indicated by the PPN2 is not the LPN2, the UECC processing module 111a determines that the mapping data corresponding to the PPN2 is corrupted.

Thereafter, the UECC processing module 111a determines whether the corrupted metadata is recoverable, recovers the corrupted metadata when the corrupted metadata is recoverable, and performs a read operation according to the read request or a write operation according to the write request using the recovered metadata. In an embodiment, when the corrupted data is unrecoverable, the UECC processing module 111a processes the unrecoverable metadata as a UECC error and updates the first mapping information 11 with second mapping information 12 by correcting the PPN2. The controller 110a may provide an error message indicating that reading is impossible with respect to the read request to the host. With respect to the write request, the controller 110a may perform a write operation using the second mapping information 12.

Figure 6:
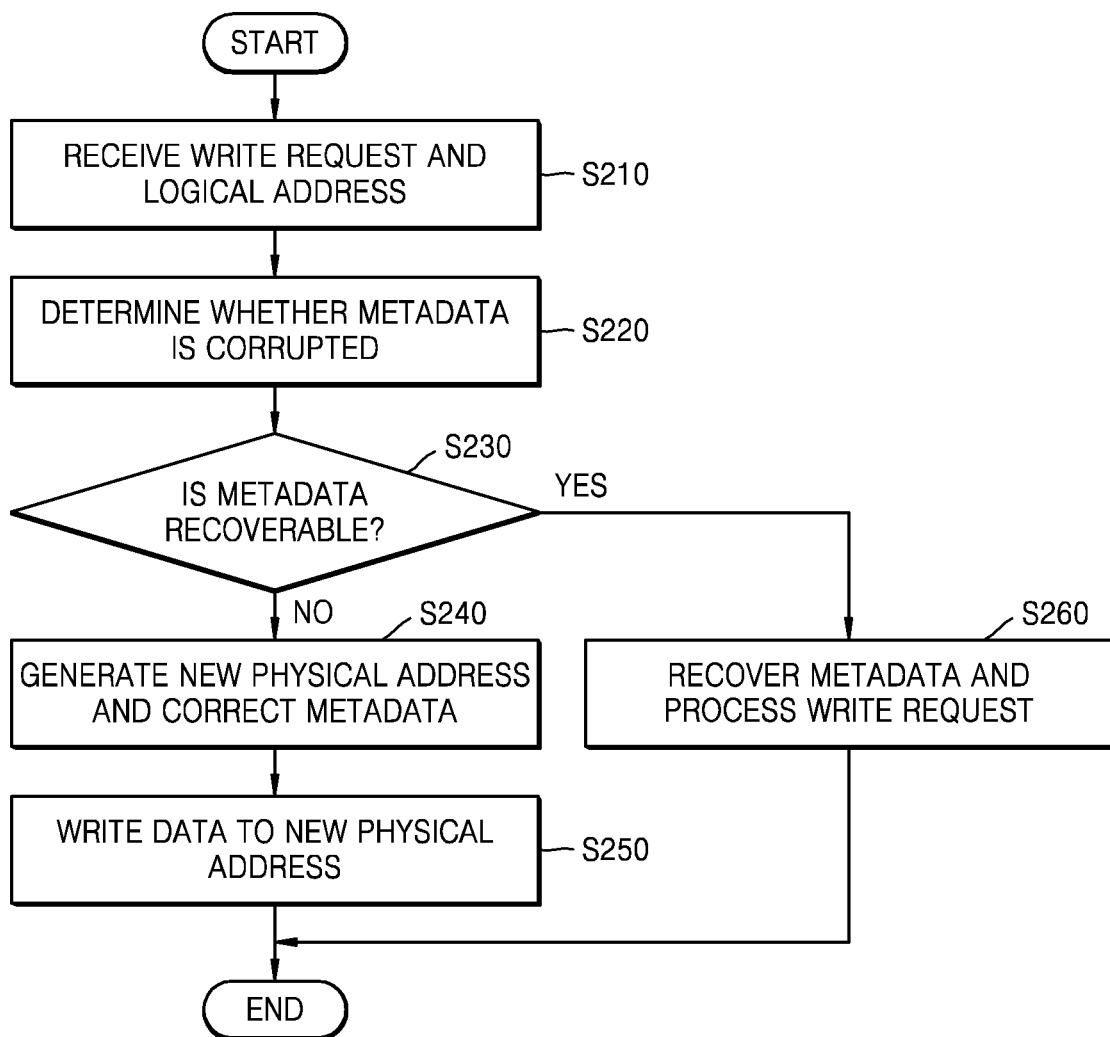
FIG. 6 is a flowchart of a method of operating a storage device, according to an exemplary embodiment of the inventive concept.

FIG. 6 is a flowchart of a method of operating a storage device according to an exemplary embodiment of the inventive concept.

Referring to FIG. 6, the method of operating a storage device relates to a method of processing unrecoverable metadata when a write request is received from a host and may include operations time-sequentially performed in, for example, the storage device 100 shown in FIG. 1. The method of operating a storage device will be described with reference to FIGS. 1 through 3B and FIG. 6 below.

The storage device 100 receives a write request and a logical address from the host 200 in operation S210. The storage device 100 determines whether metadata is corrupted in operation S220. The metadata is associated with the logical address. In an exemplary embodiment, the storage device 100 determines whether mapping data indicating a physical address corresponding to the logical address among the metadata loaded to volatile memory is corrupted. For example, the UECC processing module 111a included in the controller 110a may determine whether the mapping data is corrupted based on the physical block information BI loaded to the physical block information area 112b.

Whether the metadata is recoverable is determined in operation S230. For example, the UECC processing module 111a determines whether backup data of the metadata exists and determines that the metadata is recoverable when the backup data exists. When it is determined that the metadata is unrecoverable, operation S240 is performed. When it is determined that the metadata is recoverable, operation S260 is performed. The storage device 100 generates a new physical address for writing of data and corrects the metadata in operation S240. The storage device 100 writes the data to the new physical address in operation S250. The storage device 100 recovers the metadata and processes the write request in operation S260. If the metadata is not recoverable, then it may not be possible to determine which physical address corresponds to the received logical address. The generation of the new physical address may include determining which of the physical addresses is unused and assigning the unused physical address to the received logical address. When the metadata is recovered, the processing of the write request may include determining a physical address from the recovered metadata, and writing the data to the determined physical address. The data to written may be received along with the write request and the logical address.

Figure 7A:
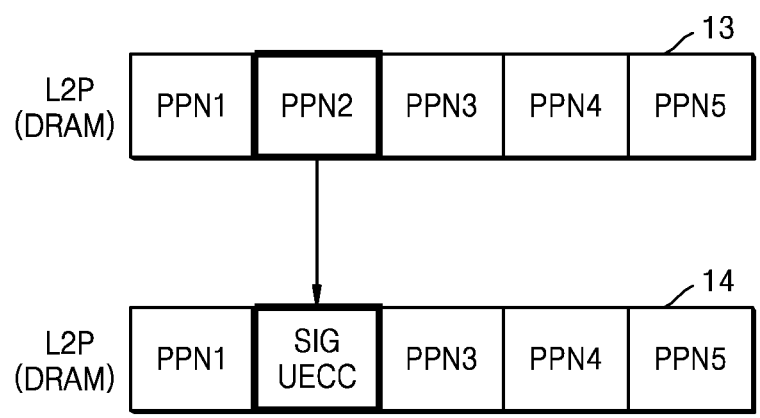
FIGS. 7A and 7B are diagrams of an operation of performing uncorrectable error correction code (UECC) processing on mapping data, according to an exemplary embodiment of the inventive concept.
Figure 7B:
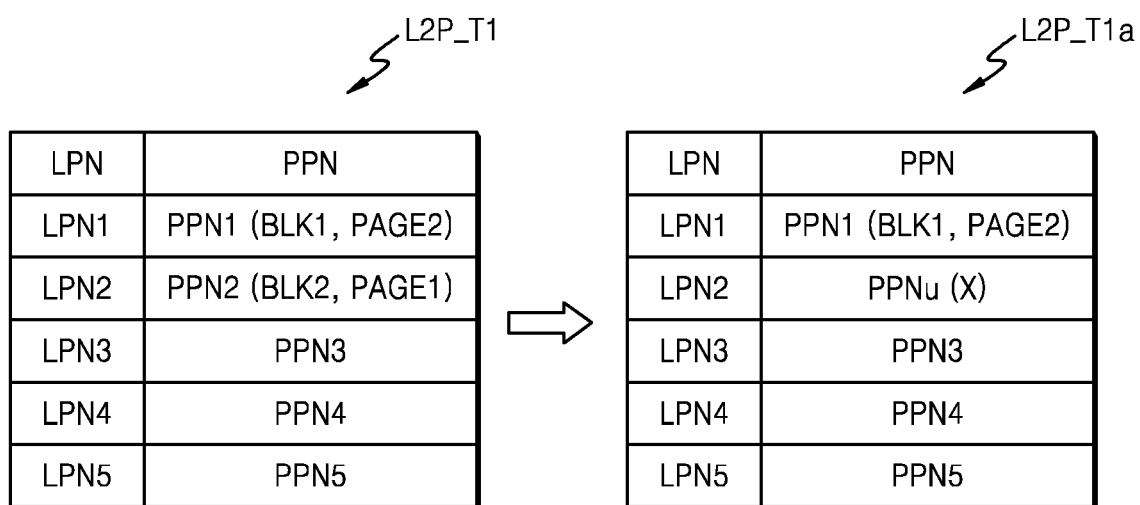

FIGS. 7A and 7B are diagrams of a UECC processing operation performed on mapping data according to an exemplary embodiment of the inventive concept. Referring to FIGS. 7A and 7B, first mapping information 13 corresponds to an L2P mapping table L2PT1 and second mapping information 14 corresponds to an L2P mapping table L2P_T1a. The first mapping information 13 and the second mapping information 14 may be loaded to a volatile memory (e.g., DRAM) included in a storage device.

The first mapping information 13 may include PPN1 through PPN5 respectively corresponding to LPN1 through LPN5. The PPN1 through PPN5 may be referred to as mapping data. When mapping data corresponding to the PPN2 in the first mapping information 13 is unrecoverable, the unrecoverable mapping data is corrected into a UECC signature SIG UECC so that the first mapping information 13 is updated with the second mapping information 14. In an embodiment, the UECC signature SIG UECC corresponds to a physical address PPNu which does not exist in the NVM 120. For example, when the NVM 120 includes PPN1 through PPN1000, the UECC signature SIG UECC may be a PPN1001. However, the inventive concept is not limited thereto and the UECC signature SIG UECC may be a random mark indicating that it is impossible to perform a read operation according to current mapping data. For example, when an attempt to read from a logical address associated with the UECC signature occurs, when the UECC signature is a physical address that is higher than an upper limit on physical addresses for the NVM 120, the controller (e.g., 110) can conclude that it is not possible to read from the logical address. For example, the controller may store the upper limit so it can determine whether a physical address in the mapping data is a UECC signature.

Figure 8:
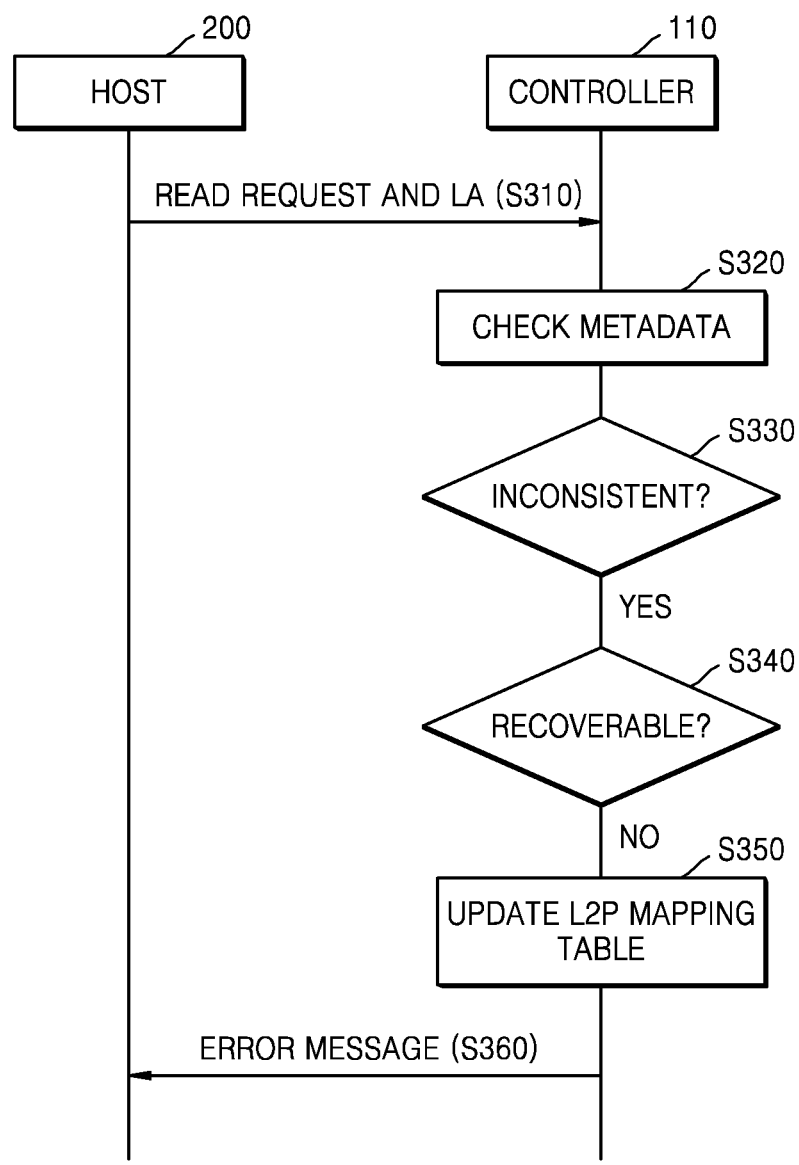
FIG. 8 is a flowchart of operations performed between a host and a controller in the UECC processing operation illustrated in FIGS. 7A and 7B, according to an exemplary embodiment of the inventive concept.

FIG. 8 is a flowchart of operations performed between the host 200 and the controller 110 in the UECC processing operation illustrated in FIGS. 7A and 7B according to an exemplary embodiment of the inventive concept. In an embodiment, the host 200 and the controller 110 respectively correspond to the host 200 and the controller 110 shown in FIG. 1. The operations will be described with reference to FIGS. 1 and 8 below.

The host 200 transmits a logical address LA and a read request to the controller 110 in operation S310. The controller 110 checks metadata associated with the logical address LA in operation S320. For example, the controller 110 may check the metadata associated with the logical address LA by referencing a table that links the logical address LA to the metadata. The controller 110 determines whether a physical address corresponding to the metadata is inconsistent with physical block information in operation S330. In an embodiment, when the physical address corresponding to the metadata is inconsistent with the physical block information, it is determined that the metadata is corrupted.

When it is determined that the metadata is corrupted, the controller 110 determines whether the corrupted metadata is recoverable in operation S340. When it is determined that the corrupted data is unrecoverable, the controller 110 updates an L2P mapping table in operation S350. In an embodiment, the controller 110 overwrites the corrupted metadata with a UECC signature in the L2P mapping table. The controller 110 transmits an error message indicating that reading is impossible with respect to the read request to the host 200 in operation S360.

According to an exemplary embodiment of the inventive concept, the controller 110 of the storage device 100 updates an L2P mapping table and transmits an error message to the host 200 according to a UECC signature. Accordingly, in response to a read request whose processing would require corrupted metadata, communication (e.g., a data input/output operation) between the controller 110 and the NVM 120 is not performed in the storage device 100, but communication between the host 200 and the controller 110 continues normally. As a result, a processing time and power consumption of the storage device 100 with respect to a read request whose processing would require corrupted metadata can be reduced.

Figure 9A:
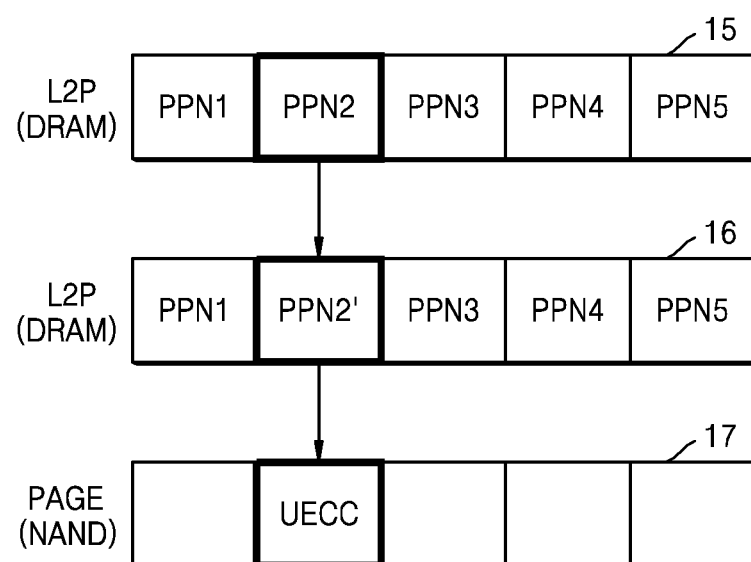
FIGS. 9A and 9B are diagrams of a UECC processing operation performed on mapping data, according to an exemplary embodiment of the inventive concept.
Figure 9B:
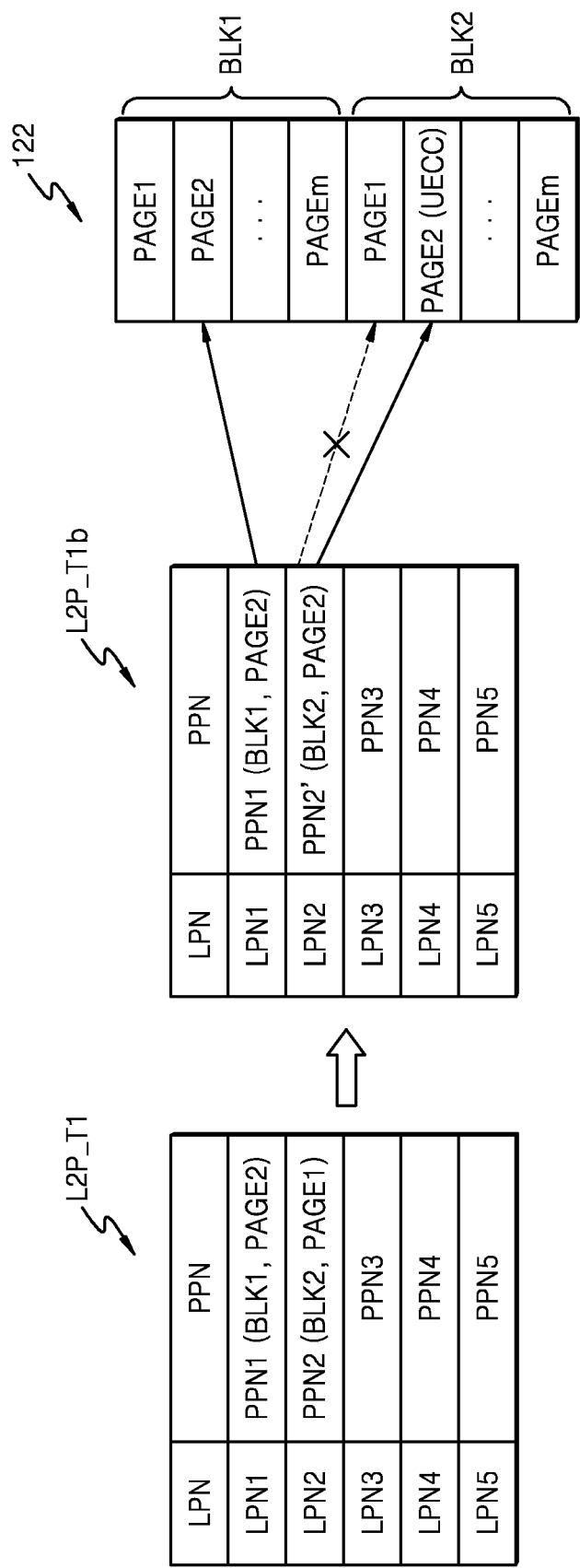

FIGS. 9A and 9B are diagrams of a UECC processing operation performed on mapping data according to an exemplary embodiment of the inventive concept. In detail, FIG. 9A shows first mapping information 15 and second mapping information 16 loaded to a volatile memory (e.g., DRAM) included in a storage device and a page 17 of an NVM (e.g., NAND memory) included in the storage device. FIG. 9B shows the mapping table L2P_T1 corresponding to the first mapping information 15, a mapping table L2P_T1b corresponding to the second mapping information 16, and a storage area (e.g., the storage area 122 in FIG. 1) of the NVM.

The first mapping information 15 may include the PPN1 through PPN5 respectively corresponding to the LPN1 through LPN5. The PPN1 through PPN5 may be referred to as mapping data. When mapping data corresponding to the PPN2 in the first mapping information 15 is unrecoverable, a physical address (i.e., the PPN2) included in the unrecoverable mapping data is corrected into a new physical address (i.e., a PPN2') so that the first mapping information 15 is updated to the second mapping information 16.

The new physical address (i.e., the PPN2') is a physical address for storing data indicating a UECC. The new physical address (i.e., the PPN2') may be allocated to a valid address. For example, the new physical address (i.e., the PPN2') may correspond to the second page PAGE2 of the second block BLK2 included in the storage area 122 and the old physical address (i.e., the PPN2) may be changed into an invalid state in physical block information. The new physical address (i.e., the PPN2') may be different for each logical address. However, the inventive concept is not limited thereto. For example, the new physical address (i.e., the PPN2') may be the same regardless of a logical address.

Figure 10:
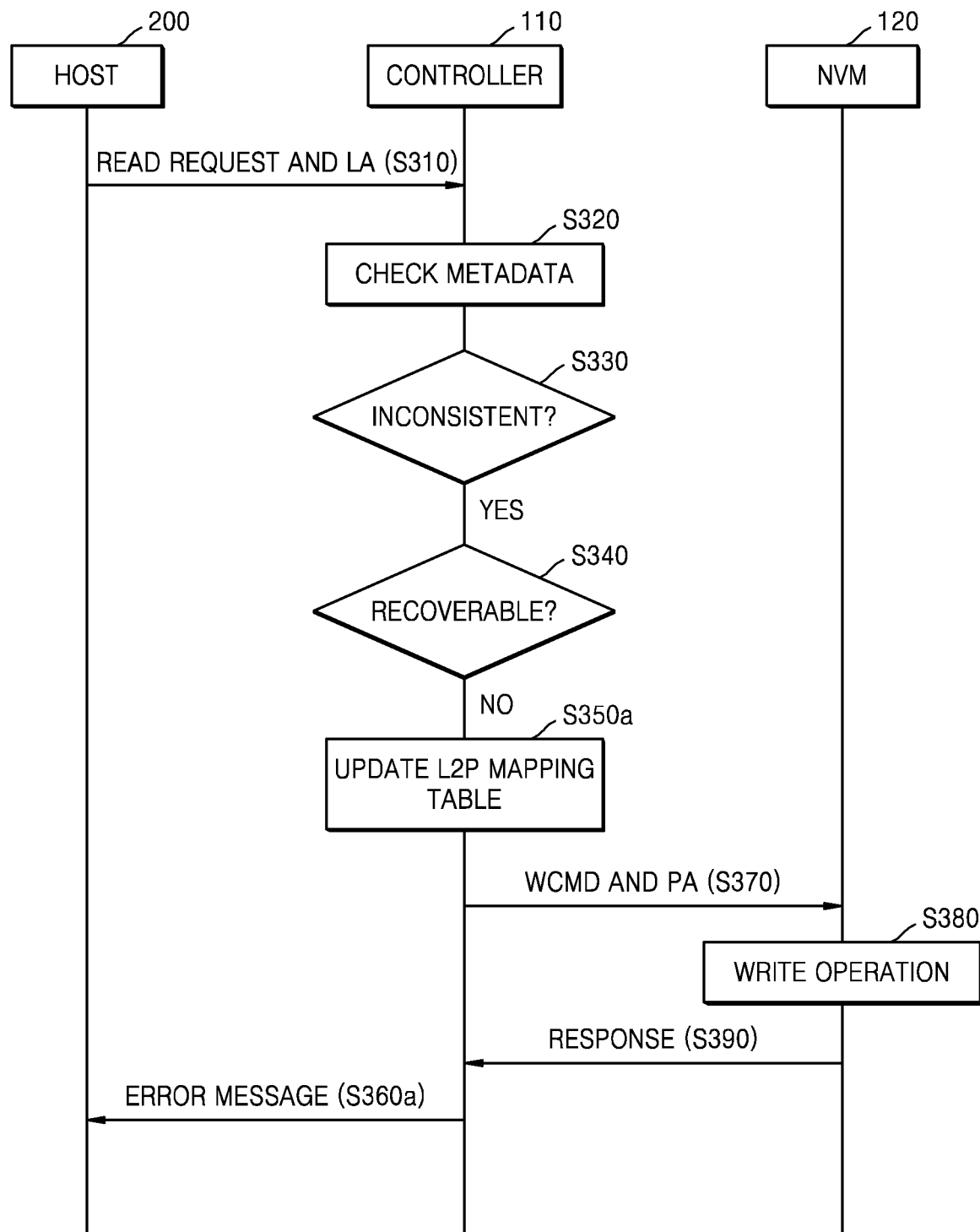
FIG. 10 is a flowchart of operations performed among a host, a controller, and a non-volatile memory in the UECC processing operation illustrated in FIGS. 9A and 9B, according to an exemplary embodiment of the inventive concept.

FIG. 10 is a flowchart of operations performed among the host 200, the controller 110, and the NVM 120 in the UECC processing operation illustrated in FIGS. 9A and 9B according to an exemplary embodiment of the inventive concept. In an embodiment, the host 200, the controller 110, and the NVM 120 respectively correspond to the host 200, the controller 110, and the NVM 120 shown in FIG. 1.

The operations illustrated in FIG. 10 are modifications of the operations illustrated in FIG. 8. Operations S310 through S340 are substantially the same as those shown in FIG. 8. Thus redundant descriptions thereof will be omitted. The controller 110 updates an L2P mapping table in operation S350a. In an embodiment, the controller 110 updates the L2P mapping table by correcting a physical address included in the corrupted metadata into a new physical address PA in the L2P mapping table.

The controller 110 transmit the new physical address PA and a write command WCMD to the NVM 120 in operation S370. The NVM 120 writes data indicating a UECC to the new physical address PA in operation S380. The new physical address PA may correspond to a spare area included in the storage area 122. The NVM 120 transmits a response message to the controller indicating that the write operation has completed in operation S390. The controller 110 transmits an error message to the host 200 indicating that reading is impossible with respect to the read request in operation S360a.

Figure 11:
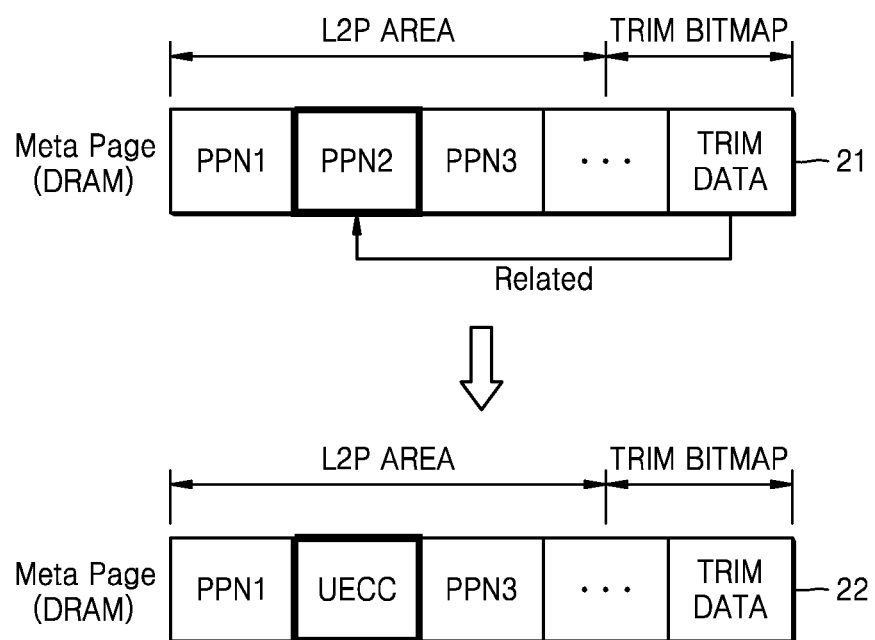
FIG. 11 is a diagram of a UECC processing operation performed on trim data, according to an exemplary embodiment of the inventive concept.

FIG. 11 is a diagram of a UECC processing operation performed on trim data according to an exemplary embodiment of the inventive concept.

Referring to FIG. 11, a first meta page 21 loaded to a volatile memory (e.g., DRAM) included in a storage device includes an L2P area which stores mapping data indicating a physical address corresponding to a logical address and a trim bitmap which stores trim data indicating data erased from a host. When the storage device supports a trim function, the first meta page 21 includes the trim bitmap. In an exemplary embodiment, when the host erases data which has been written to the storage device, data of a corresponding block is not actually deleted from an NVM, but erasure of the data is only marked in the trim data included in the trim bitmap. In an embodiment, the trim data includes a plurality of bits and each bit indicates erasure or non-erasure of user data corresponding to mapping data. For example, a first bit of the trim data could indicate whether data associated with PPN1 is erased, a second bit of the trim data could indicate whether data associated with PPN2 is erased, etc.

When the trim data is corrupted in the first meta page 21, mapping data related to the corrupted trim data is checked. The related mapping data may be checked according to the placement order of the bits. The mapping data related to the corrupted trim data may be the PPN2. The first meta page 21 may be corrected into a second meta page 22 by performing UECC processing on the PPN2. The PPN2 may be expressed as a UECC signature in the second meta page 22. In an embodiment, the PPN2 is corrected into a new physical address (i.e., the PPN2') in the second meta page 22.

Figure 12:
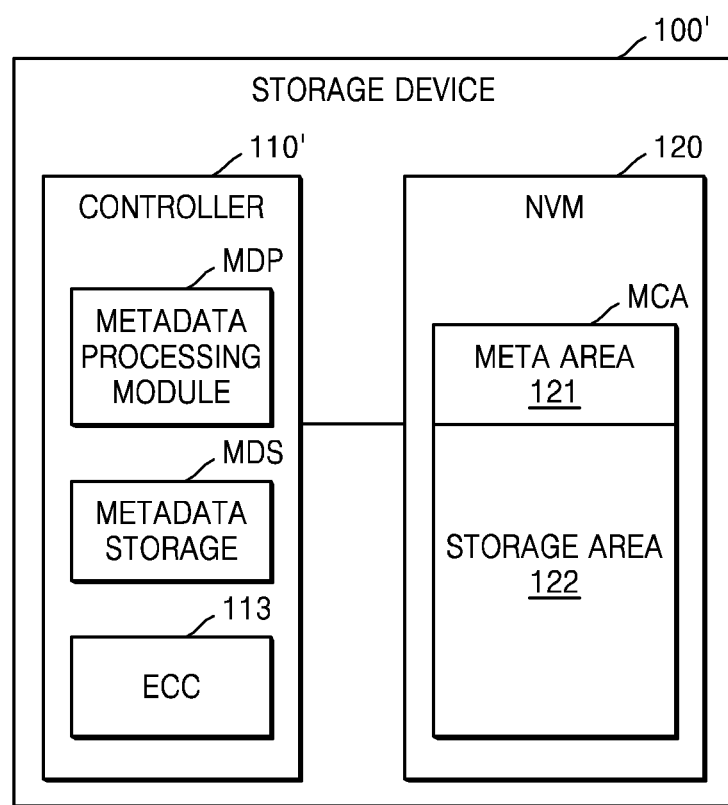
FIG. 12 is a block diagram of a storage device according to an exemplary embodiment of the inventive concept.

FIG. 12 is a block diagram of a storage device 100' according to an exemplary embodiment of the inventive concept.

Referring to FIG. 12, the storage device 100' includes a controller 110' and the NVM 120. The storage device 100' is a modification of the storage device 100 shown in FIG. 1. Thus redundant descriptions thereof will be omitted. Unlike the controller 110 shown in FIG. 1, the controller 110' further includes an error checking and correction (ECC) module 113. In an embodiment, the ECC module 113 detects an error bit in metadata stored in the metadata storage MDS by performing an ECC operation on the metadata and corrects the error bit. The ECC module 113 may perform an ECC operation on each ECC chunk.

Figure 13:
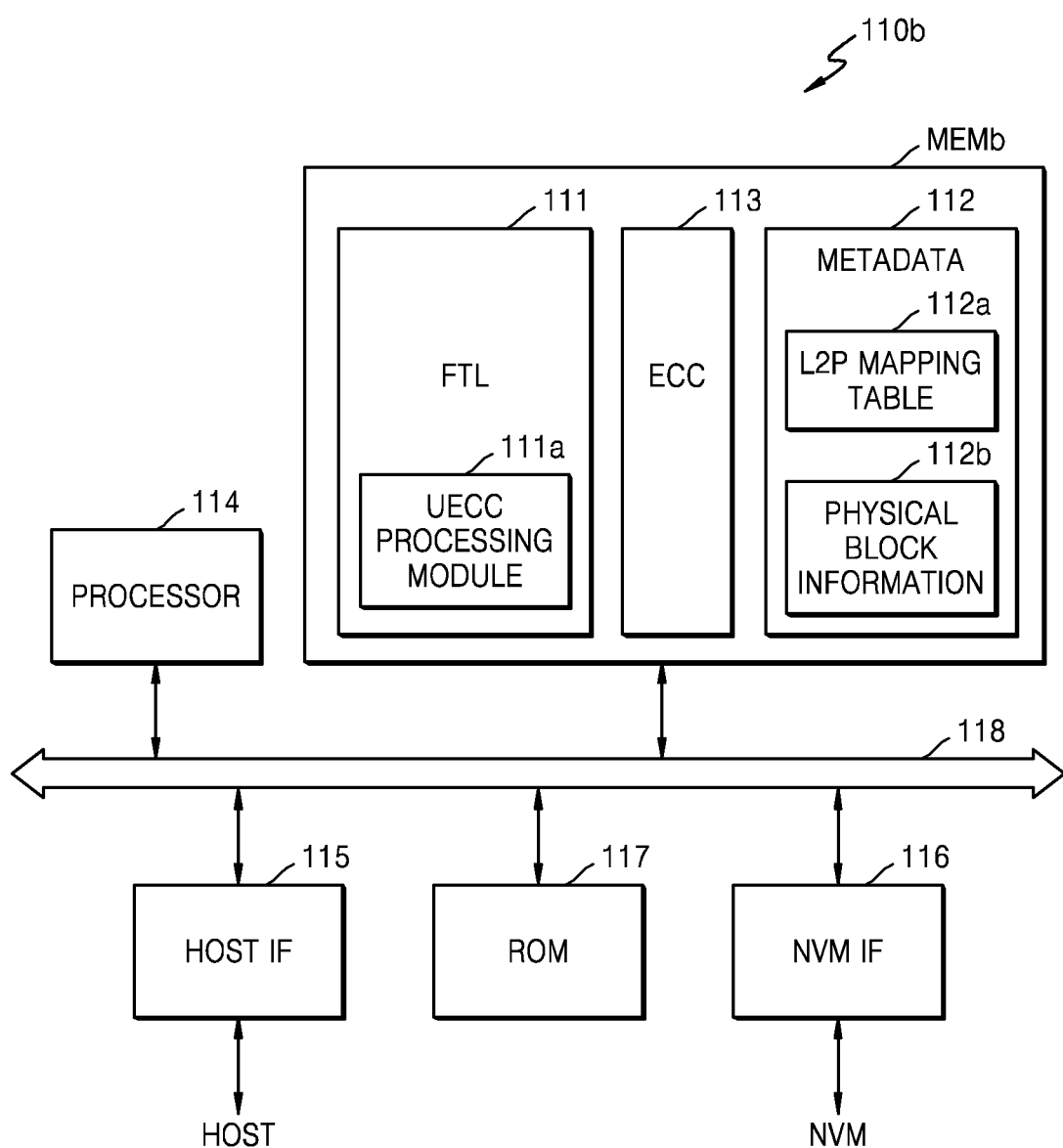
FIG. 13 is a block diagram of an example of a controller illustrated in FIG. 12.

FIG. 13 is a block diagram of an example 110b of the controller 110' shown in FIG. 12. Referring to FIG. 13, the controller 110b is a modification of the controller 110a shown in FIG. 2. Thus redundant descriptions thereof will be omitted. Unlike the memory MEMa shown in FIG. 2, a memory MEMb further includes the ECC module 113. The ECC module 113 may be implemented by software or firmware and may be loaded to the memory MEMb. Alternatively, the ECC module 113 may be implemented by hardware (e.g., a circuit) in the memory MEMb. Although the FTL 111 and the ECC module 113 are separated from each other in FIG. 13, the inventive concept is not limited thereto. In an exemplary embodiment, the ECC module 113 is implemented as a part of the FTL 111. Although the ECC module 113 is located inside the memory MEMb in FIG. 13, the inventive concept is not limited thereto. In an exemplary embodiment, the ECC module 113 is located outside the memory MEMb.

Figure 14:
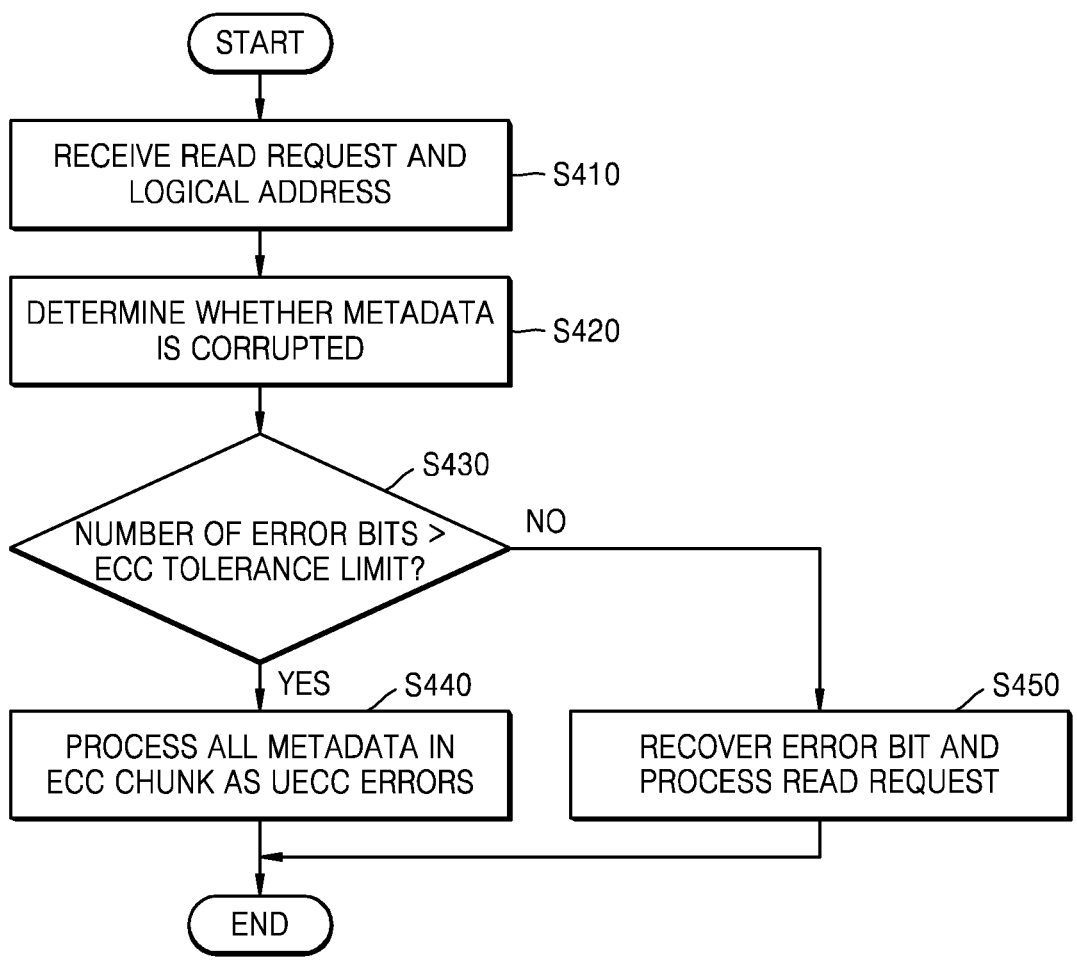
FIG. 14 is a flowchart of a method of operating a storage device, according to an exemplary embodiment of the inventive concept.

FIG. 14 is a flowchart of a method of operating a storage device according to an exemplary embodiment of the inventive concept.

Referring to FIG. 14, the method of operating a storage device relates to a method of processing unrecoverable metadata when a read request is received from a host and may include operations time-sequentially performed in, for example, the storage device 100' shown in FIG. 12. The method of operating a storage device will be described with reference to FIGS. 12 through 14 below.

The storage device 100' receives a read request and a logical address from a host in operation S410. The storage device 100' determines whether metadata is corrupted in operation S420. For example, the metadata is associated with the received logical address. In an embodiment, the storage device 100' determines whether the metadata is corrupted by checking whether an error bit exists by performing an ECC operation on each ECC chunk of the metadata. For example, the UECC processing module 111a included in the controller 110b may determine whether the metadata is corrupted based on an output of the ECC module 113 without referring to the physical block information BI loaded to the physical block information area 112b.

Whether the number of error bits exceeds an ECC tolerance limit is determined in operation S430. The ECC tolerance limit is the number of error bits which can be corrected by the ECC module 113. For example, the ECC tolerance limit of the ECC module 113 could correspond to one. When it is determined that the number of error bits exceeds the ECC tolerance limit, operation S440 is performed. When it is determined that the number of error bits does not exceed the ECC tolerance limit, operation S450 is performed. Operation S430 will be described in detail with reference to FIG. 15 later.

All metadata in the ECC chunk are processed as UECC errors in operation S440. For example, the UECC processing module 111a may process all metadata included in the ECC chunk as UECC errors when the number of error bits exceeds the ECC tolerance limit. An error bit is recovered and the read request is processed in operation S450. For example, the ECC module 113 may recover the error bit and the storage device 100' may perform a read operation according to the read request. In an embodiment, the error bit is recovered when the ECC module 113 is able to correct the metadata, and the storage device 100 performs the read operation using the corrected metadata. When the ECC module 113 is not able to correct the metadata, the storage device 100 is not able to perform the read operation.

Figure 15:
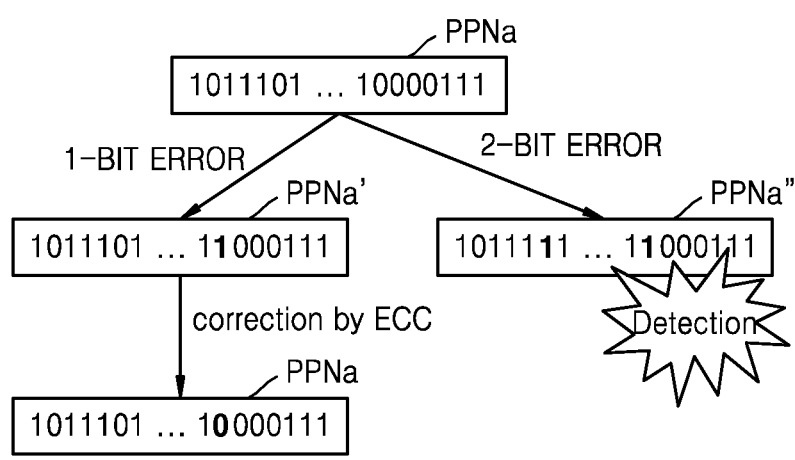
FIG. 15 is a diagram of an error checking and correction (ECC) operation performed based on the number of error bits in metadata, according to an exemplary embodiment of the inventive concept.

FIG. 15 is a diagram of an ECC operation performed based on the number of error bits in metadata according to an exemplary embodiment of the inventive concept.

Referring to FIGS. 13 and 15, the ECC tolerance limit of the ECC module 113 is one error bit. When there is a 1-bit error in a physical address PPNa, the physical address PPNa is changed into a first corrupted physical address PPNa'. The ECC module 113 can correct the 1-bit error since the number of error bits is one, and therefore, the first corrupted physical address PPNa' is corrected into the normal physical address PPNa.

However, when there is a 2-bit error in the physical address PPNa, the physical address PPNa is changed into a second corrupted physical address PPNa". Since the number of error bits is two, the ECC module 113 can detect the 2-bit error but cannot correct the 2-bit error. Accordingly, the second corrupted physical address PPNa" may correspond to unrecoverable metadata.

Figure 16:
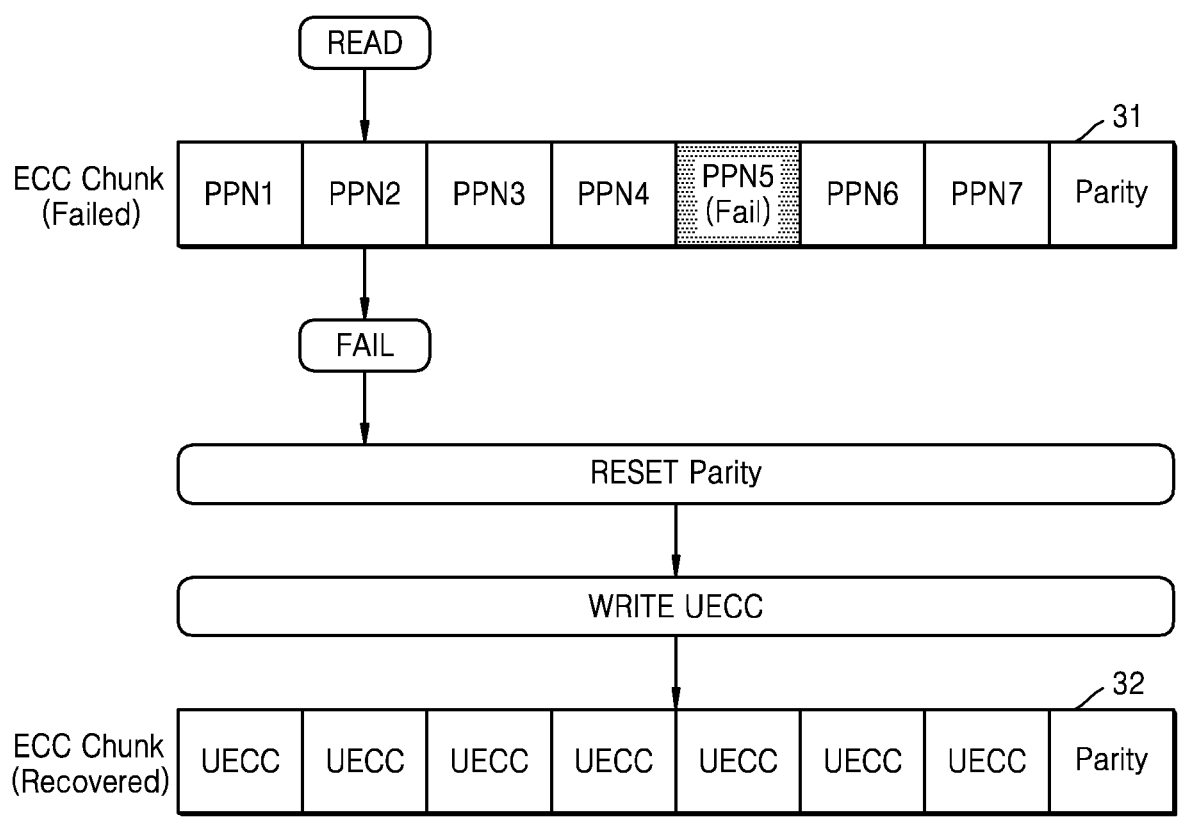
FIG. 16 is a diagram of an operation of processing unrecoverable metadata, according to an exemplary embodiment of the inventive concept.

FIG. 16 is a diagram of an operation of processing unrecoverable metadata according to an exemplary embodiment of the inventive concept.

Referring to FIGS. 12 and 16, a first ECC chunk 31 is stored in the metadata area 112 of the memory MEMb illustrated in FIG. 13 and the memory MEMb may be DRAM. The first ECC chunk 31 may include a plurality of mapping data PPN1 through PPN7 and parity. The size of each mapping data may be 4 bytes and the size of the first ECC chunk 31 may be 32 bytes, but the inventive concept is not limited thereto. For example, the mapping data PPN5 may have error bits exceeding an ECC tolerance limit.

In an embodiment, the ECC module 113 detects an error bit in the first ECC chunk 31 by checking the parity and corrects error bits within the ECC tolerance limit. However, when the number of error bits detected exceeds the ECC tolerance limit, the ECC module 113 cannot correct the error bits. When the number of errors exceeds the ECC tolerance limit, the metadata processing module MDP determines that all mapping data PPN1 through PPN7 included in the first ECC chunk 31 are unrecoverable metadata.

In an embodiment, the metadata processing module MDP resets the parity according to the current state of the mapping data PPN1 through PPN7 included in the first ECC chunk 31 and processes all mapping data PPN1 through PPN7 as UECC errors, thereby correcting the first ECC chunk 31 into a second ECC chunk 32. After the correcting, a UECC write operation may be performed for UECC error processing. The UECC write operation may be performed on the NVM 120 of the storage device 100'. Alternatively, the UECC write operation may be performed on a volatile memory (e.g., DRAM) of the storage device 100' and the volatile memory may be included in the controller 110'.

When the storage device 100' receives a read request related to a plurality of mapping data included in the second ECC chunk 32, the storage device 100' may provide an error message to host indicating that reading is impossible with respect to the read request. An operation of processing mapping data as a UECC error will be described with reference to FIGS. 17A through 19 below.

Figure 17A:
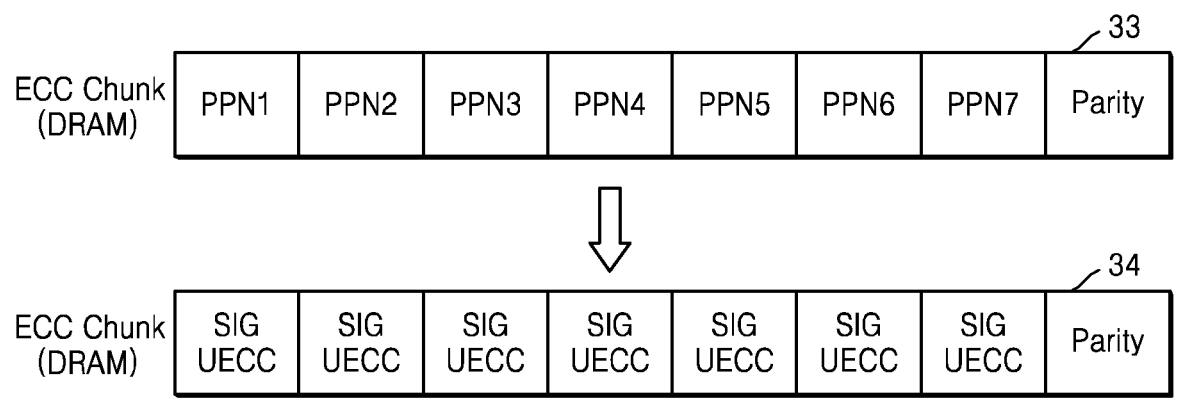
FIGS. 17A through 19 are diagrams of a UECC processing operation performed on mapping data, according to an exemplary embodiment of the inventive concept.
Figure 17B:
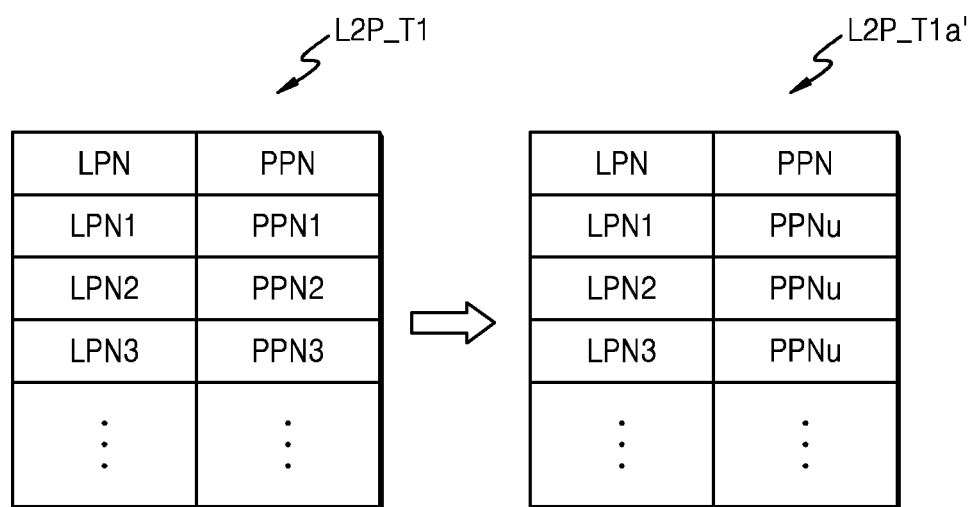

FIGS. 17A and 17B are diagrams of a UECC processing operation performed on mapping data according to an exemplary embodiment of the inventive concept. Referring to FIGS. 17A and 17B, a first ECC chunk 33 may correspond to the L2P mapping table L2P_T1 and a second ECC chunk 34 may correspond to an L2P mapping table L2P_T1a'. The first and second ECC chunks 33 and 34 may be stored in a volatile memory (e.g., DRAM) included in a storage device.

The first ECC chunk 33 may include the PPN1 through PPN7 respectively corresponding to LPN1 through LPN7. The PPN1 through PPN7 may be referred to as mapping data. When a read request with respect to one among the LPN1 through LPN7 is received, an error bit in the first ECC chunk 33 may be detected by checking parity data included in the first ECC chunk 33 and may be corrected within an ECC tolerance limit. However, when the number of detected error bits exceeds the ECC tolerance limit, it may be determined that all mapping data PPN1 through PPN7 included in the first ECC chunk 33 are unrecoverable metadata.

At this time, the first ECC chunk 33 may be updated with the second ECC chunk 34 by correcting all mapping data PPN1 through PPN7 included in the first ECC chunk 33 into the UECC signature SIG UECC. The UECC signature SIG UECC may correspond to the physical address PPNu which does not exist in the NVM 120. Accordingly, every physical address corresponding to the second ECC chunk 34 may correspond to the PPNu in the mapping table L2P_T1a'. Although all PPNs corresponding to the LPN1 through LPN3 are the PPNu in the mapping table L2P_T1a', the inventive concept is not limited thereto. In an exemplary embodiment, UECC signatures corresponding to different logical addresses may be different from each other.

Figure 18:
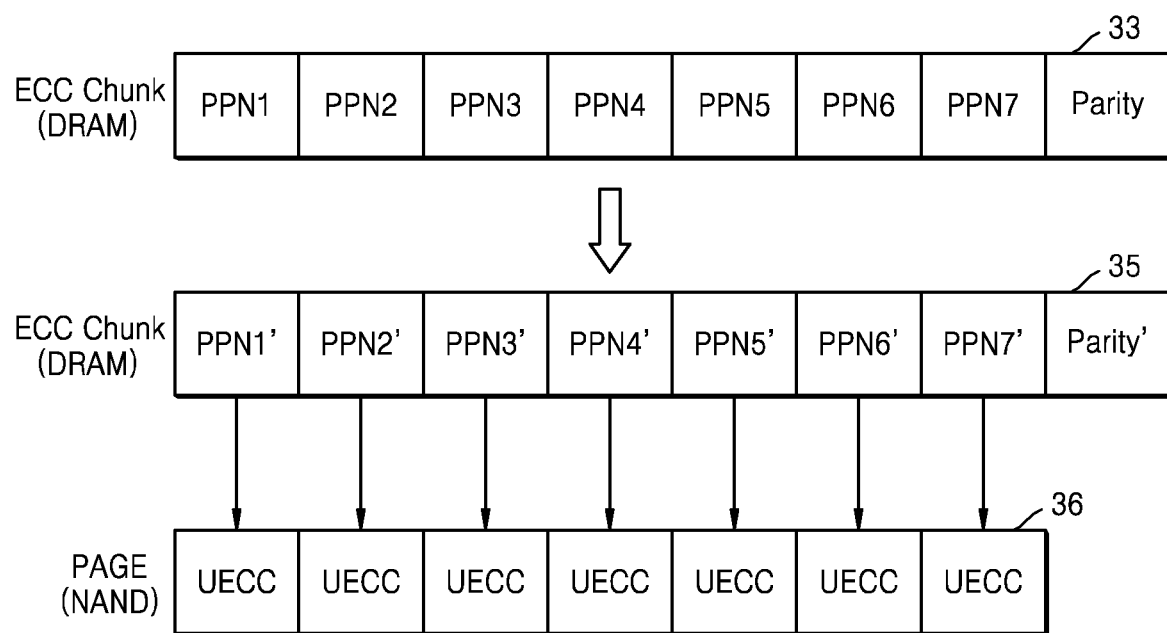

FIG. 18 is a diagram of a UECC processing operation performed on mapping data according to an exemplary embodiment of the inventive concept. FIG. 18 shows first and second ECC chunks 33 and 35 stored in a volatile memory (e.g., DRAM) included in a storage device and a page 36 of an NVM (e.g., a NAND memory) included in the storage device. FIGS. 12 and 18 will be referred to in the description below.

When mapping data included in the first ECC chunk 33 stored in the DRAM is corrupted and unrecoverable, the first ECC chunk 33 is updated with the second ECC chunk 35 by processing all mapping data included in the first ECC chunk 33 as UECC errors. The PPN1 through PPN7 may be corrected into different new physical addresses PPN1' through PPN7' and parity may be corrected into parity' according to the new physical addresses PPN1' through PPN7' in the second ECC chunk 35. Each of the new physical addresses PPN1' through PPN7' may be a physical address for storing data indicating a UECC error and may be allocated to a valid address.

Thereafter, the data indicating a UECC error may be stored in the page 36 of the NVM 120. The page 36 may be one of a plurality of pages included in the storage area 122 of the NVM 120. The data indicating a UECC error may be stored in a spare area or a reserved area included in the page 36. Although the new physical addresses PPN1' through PPN7' correspond to one page 36 in one block in FIG. 18, the inventive concept is not limited thereto. Each of the new physical addresses PPN1' through PPN7' may correspond to a different block or page of the meta area 121.

When the storage device 100' receives a read request with respect to a logical address corresponding to one of a plurality of mapping data included in the second ECC chunk 35, the storage device 100' reads the page 36 of the NVM 120 which is indicated by a physical address corresponding to the logical address and provides a read result to a host. For example, when the storage device 100' receives a read request with respect to the LPN2, the storage device 100' reads the page 36 of the NVM 120 which is indicated by the PPN2' and may provide an error message to the host indicating that reading is impossible with respect to the read request.

Figure 19:
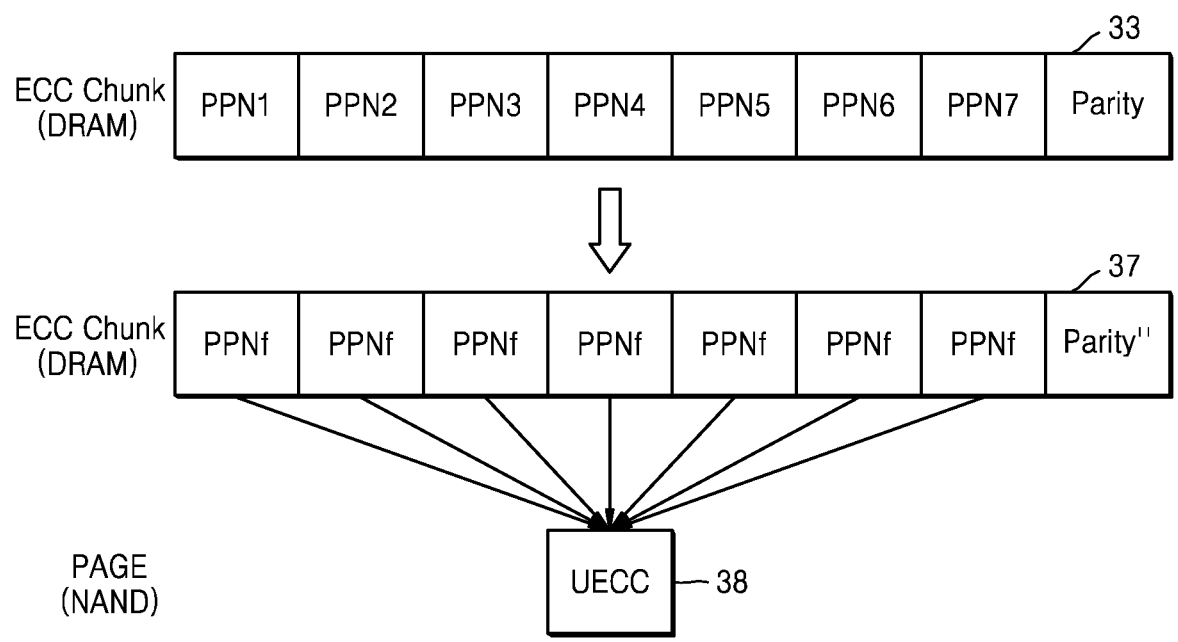

FIG. 19 is a diagram of a UECC processing operation performed on mapping data according to an exemplary embodiment of the inventive concept. FIG. 19 shows first and second ECC chunks 33 and 37 stored in a volatile memory (e.g., DRAM) included in a storage device and a page 38 of an NVM (e.g., a NAND memory) included in the storage device. FIGS. 12 and 19 will be referred to in the description below.

When mapping data included in the first ECC chunk 33 stored in the DRAM is corrupted and unrecoverable, the first ECC chunk 33 is updated with the second ECC chunk 37 by processing all mapping data included in the first ECC chunk 33 as UECC errors. The PPN1 through PPN7 may be corrected into one fixed physical address PPNf and the parity may be corrected into parity" according to the fixed physical address PPNf in the second ECC chunk 37. The fixed physical address PPNf may be a physical address predefined to store data indicating a UECC error and may be allocated to a valid address.

Thereafter, the data indicating a UECC error may be stored in the page 38 of the NVM 120. The page 38 may be one of a plurality of pages included in the storage area 122 of the NVM 120. The data indicating a UECC error may be stored in a spare area or a reserved area included in the page 38.

When the storage device 100' receives a read request with respect to a logical address corresponding to one of a plurality of mapping data included in the second ECC chunk 37, the storage device 100' reads the page 38 of the NVM 120 which is indicated by the fixed physical address PPNf and provides a read result to a host. For example, when the storage device 100' receives a read request with respect to the LPN2, the storage device 100' reads the page 38 of the NVM 120 which is indicated by PPNf and provides an error message to the host indicating that reading is impossible with respect to the read request.

Figure 20:
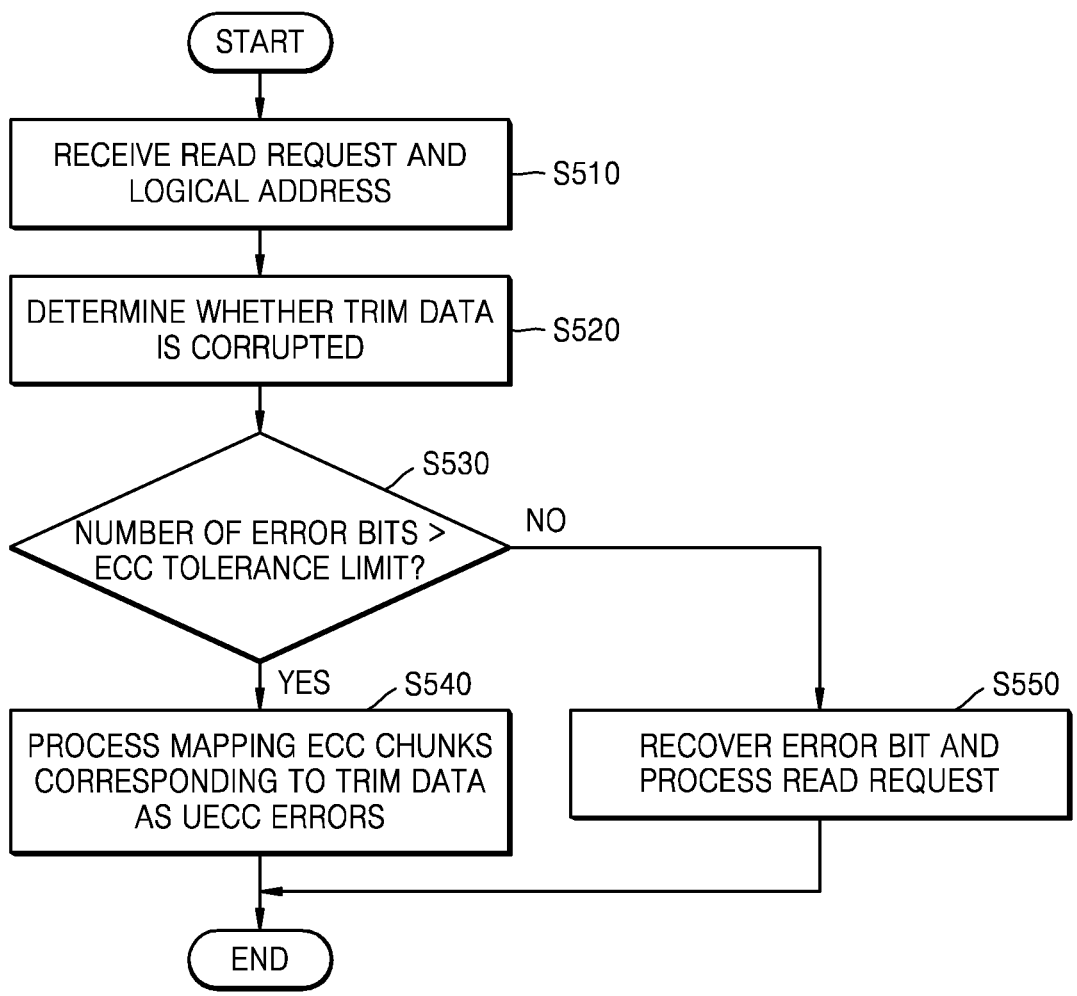
FIG. 20 is a flowchart of a method of operating a storage device according to an exemplary embodiment of the inventive concept.

FIG. 20 is a flowchart of a method of operating a storage device according to an exemplary embodiment of the inventive concept.

Referring to FIG. 20, the method of operating a storage device relates to a method of processing unrecoverable metadata when a read request is received from a host and may include operations time-sequentially performed in, for example, the storage device 100' shown in FIG. 12. The method of operating a storage device will be described with reference to FIGS. 12 and 20 below.

The storage device 100' receives a read request and a logical address in operation S510. The storage device 100' determines whether trim data is corrupted in operation S520. In an embodiment, the storage device 100' determines whether the trim data is corrupted by checking whether there is an error bit by performing an ECC operation on each ECC chunk of trim data. For example, the UECC processing module 111*a* included in the controller 110*b* may determine whether the trim data is corrupted based on an output of the ECC module 113 without referring to the physical block information BI loaded to the physical block information area 112*b*.

Whether the number of error bits exceeds an ECC tolerance limit is determined in operation S530. Operation S530 may substantially be the same as operation S430 shown in FIG. 14. Mapping ECC chunks corresponding to the trim data are processed as UECC errors in operation S540. For example, the UECC processing module 111*a* may process all metadata included in each mapping ECC chunk as UECC errors. An error bit is recovered and the read request is processed in operation S550.

Figure 21:
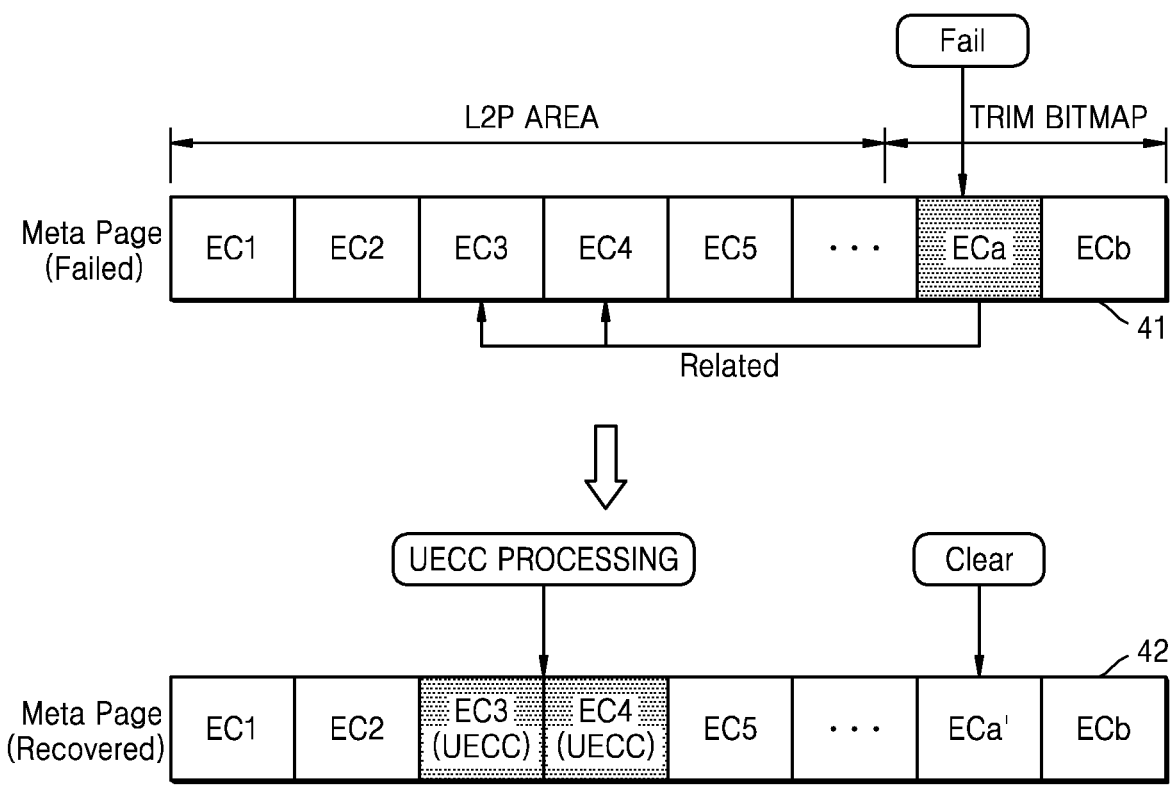
FIG. 21 is a diagram of a UECC processing operation performed on unrecoverable trim data, according to an exemplary embodiment of the inventive concept.

FIG. 21 is a diagram of a UECC processing operation performed on unrecoverable trim data according to an exemplary embodiment of the inventive concept.

Referring to FIGS. 12 and 21, a first meta page 41 may be stored in the metadata area 112 of, for example, the memory MEMb shown in FIG. 13. The memory MEMb may be DRAM. The first meta page 41 includes an L2P area which includes mapping data indicating a physical address corresponding to a logical address and a trim bitmap which includes trim data indicating data erased from a host.

The L2P area may include a plurality of mapping ECC chunks EC1 through EC5 and the trim bitmap may include first and second trim ECC chunks ECa and ECb. For example, the first trim ECC chunk ECa may be corrupted and may be related to the third and fourth mapping ECC chunks EC3 and EC4. In other words, the first trim ECC chunk ECa may indicate erasure or non-erasure of user data corresponding to mapping data included in the third and fourth mapping ECC chunks EC3 and EC4.

The first meta page 41 may be corrected into a second meta page 42 by performing UECC processing on the third and fourth mapping ECC chunks EC3 and EC4 related to the corrupted first trim ECC chunk ECa. Accordingly, a plurality of mapping data included in the third mapping ECC chunk EC3 and a plurality of mapping data included in the fourth mapping ECC chunk EC4 may all be UECC-processed. The third mapping ECC chunk EC3 may correspond to the first ECC chunk 31 shown in FIG. 16. The first trim ECC chunk ECa which has been corrupted may be reset to ECa'.

Figure 22:
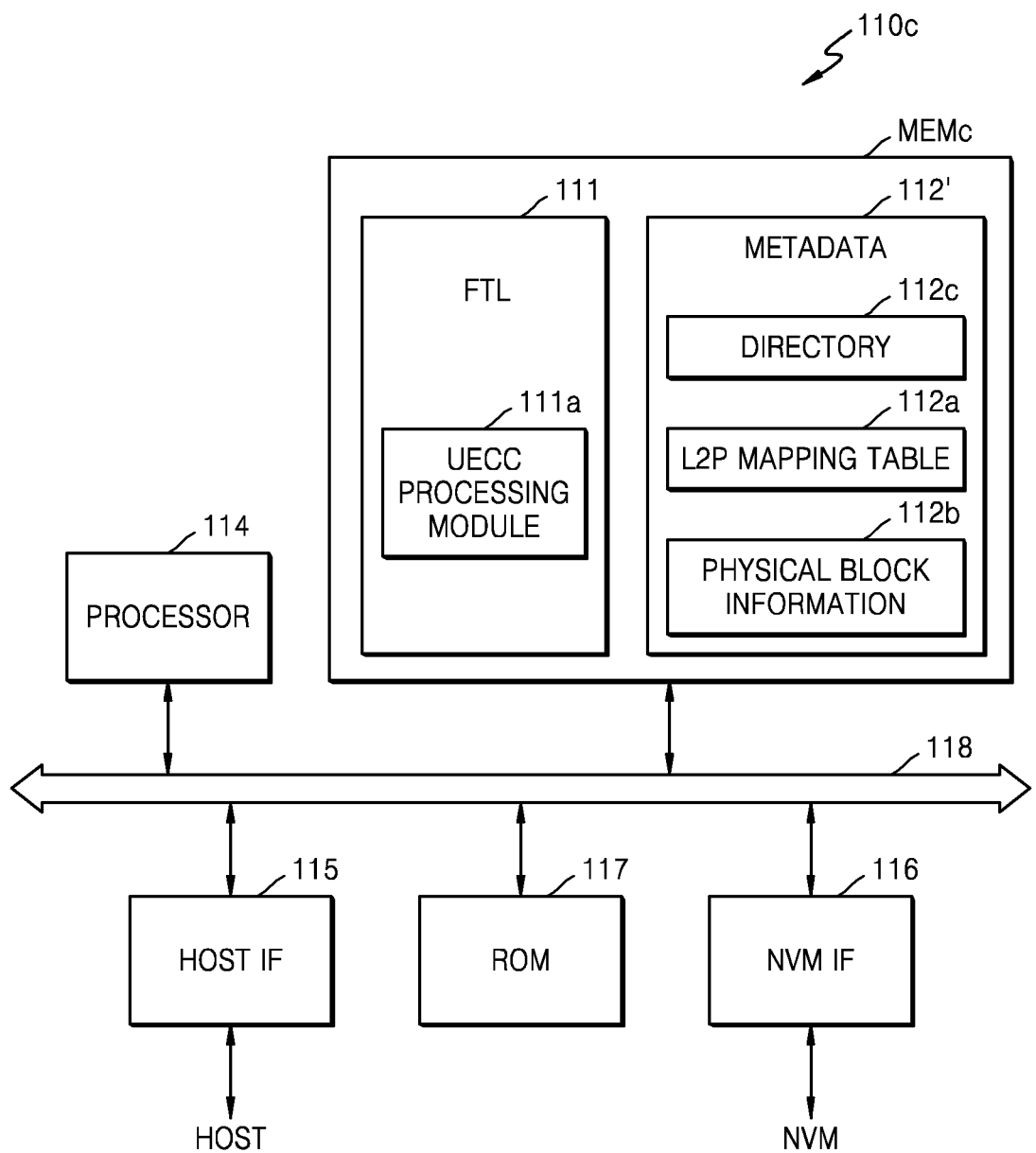
FIG. 22 is a block diagram of a controller according to an exemplary embodiment of the inventive concept.

FIG. 22 is a block diagram of a controller 110*c* according to an exemplary embodiment of the inventive concept. Referring to FIG. 22, the controller 110*c* is a modification of the controller 110*a* shown in FIG. 2. Thus redundant descriptions thereof will be omitted. Unlike the metadata area 112 shown in FIG. 2, a metadata area 112' further includes a directory area 112*c* which stores a directory. FIGS. 1 and 22 will be referred to in the description below.

The directory area 112*c* stores a directory, which may be loaded from the meta area 121 of the NVM 120 to a memory MEMc when power is supplied to a storage device. The directory may include a plurality of directory data. Each directory data may indicate a physical address at which metadata is stored. For example, the directory may indicate a physical address at which metadata such as a mapping table or physical block information is stored in the meta area 121 of the NVM 120.

Figure 23:
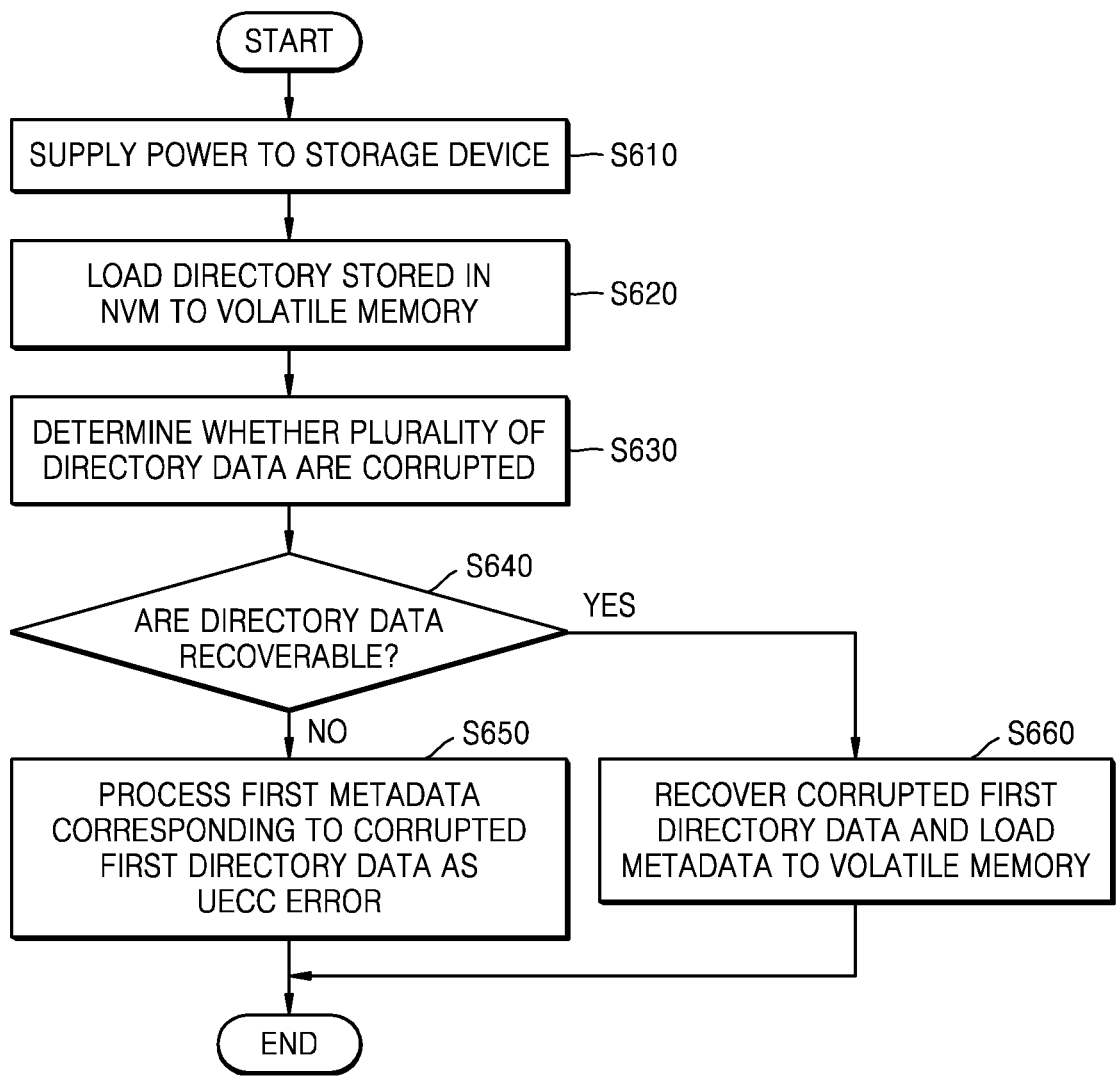
FIG. 23 is a flowchart of a method of operating a storage device, according to an exemplary embodiment of the inventive concept.

FIG. 23 is a flowchart of a method of operating a storage device according to an exemplary embodiment of the inventive concept.

Referring to FIG. 23, the method of operating a storage device relates to a method of processing corrupted directory data and may include operations time-sequentially performed in, for example, the storage device 100 shown in FIG. 1 and the controller 110*c* shown in FIG. 22. The method of operating the storage device 100 will be described with reference to FIGS. 1, 22, and 23 below.

Power is supplied to the storage device 100 in operation S610. A directory stored in the NVM 120 is loaded to the volatile memory MEMc in operation S620. The directory stored in the meta area 121 of the NVM 120 may be loaded to the directory area 112c of the volatile memory MEMc. Whether a plurality of directory data are corrupted is determined in operation S630. For example, the UECC processing module 111a included in the controller 110c may determine whether the directory data loaded to the directory area 112c is corrupted based on the physical block information BI loaded to the physical block information area 112b.

Whether corrupted directory data is recoverable is determined in operation S640. For example, the UECC processing module 111a may determine whether backup data of the directory data exists and may determine that the corrupted directory data is recoverable when the backup data exists. When it is determined that the corrupted directory data is unrecoverable, operation S650 is performed. When it is determined that the corrupted directory data is recoverable, operation S660 is performed. First metadata corresponding to first directory data that has been corrupted is processed as a UECC error in operation S650. The first directory data that has been corrupted is recovered and metadata is loaded to the volatile memory MEMc in operation S660. If none of the plurality of directory data is corrupted, none of the metadata associated with the directory data is processed as a UECC error.

Figure 24A:
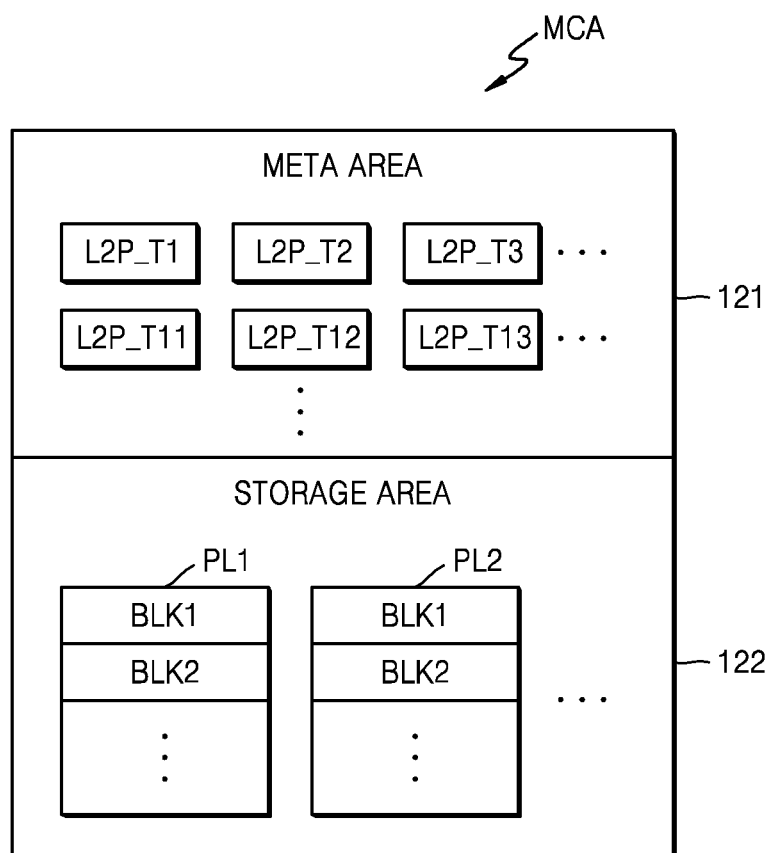
FIG. 24A is a diagram of a memory cell array included in a non-volatile memory illustrated in FIG. 1, according to an exemplary embodiment of the inventive concept.
Figure 24B:
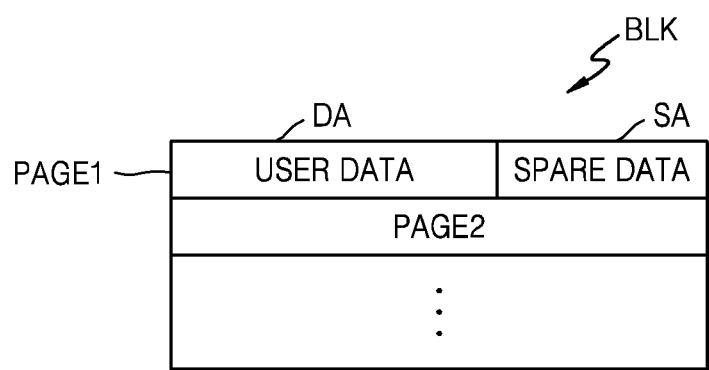
FIG. 24B is a diagram of a memory block included in a storage area illustrated in FIG. 24A, according to an exemplary embodiment of the inventive concept.

FIG. 24A is a diagram of the memory cell array MCA included in the NVM 120 shown in FIG. 1 according to an exemplary embodiment of the inventive concept. FIG. 24B is a diagram of a memory block included in the storage area 122 shown in FIG. 24A according to an exemplary embodiment of the inventive concept. FIGS. 1, 24A, and 24B are referred to in the description below.

Referring to FIG. 24A, the meta area 121 includes a plurality of mapping tables L2P_T1 through L2P_T13, which store mapping information with respect to user data stored in the storage area 122. The storage area 122 may be physically or logically divided into various units. For example, the storage area 122 may include a plurality of planes PL1 and PL2, each of which may include a plurality of blocks BLK1 and BLK2. Each block BLK1 or BLK2 may be an erasure unit of the NVM 120. Even when only a single page of an erasure unit (e.g., a block) is to be deleted, such deletion may require deletion of the entire erasure unit.

Referring to FIG. 24B, a block BLK may correspond to one of the blocks BLK1 and BLK2 shown in FIG. 24A. The block BLK may include a plurality of pages PAGE1 and PAGE2. A plurality of memory cells included in each of the pages PAGE1 and PAGE2 may be connected to one word line. A write/read unit of the NVM 120 may correspond to the size of each page. For example, when the write unit is the size of a page, even if data sized less than the page is to be written to the NVM 120, such writing may require an entire page to be written. The first page PAGE1 includes a data area DA and a spare area SA. User data requested by the controller 110 to be written may be written to the data area DA.

The spare area SA may be empty space other than the data area DA in the first page PAGE1. The spare area SA may store spare data, for example, recovery information. The recovery information for recovering metadata stored in the metadata storage MDS (e.g., a DRAM) of the controller 110 when the storage device 100 is abnormally stopped may be written to the spare area SA. The recovery information may include a logical address (e.g., an LPN) corresponding to the first page PAGE1. Accordingly, the metadata stored in the metadata storage MDS may be compared to the logical address included in the recovery information stored in the spare area SA to determine whether the metadata stored in the metadata storage MDS is valid or invalid. ECC parity for detecting and/or correcting an error occurring in data written to the data area DA may also be written to the spare area SA.

Figure 25:
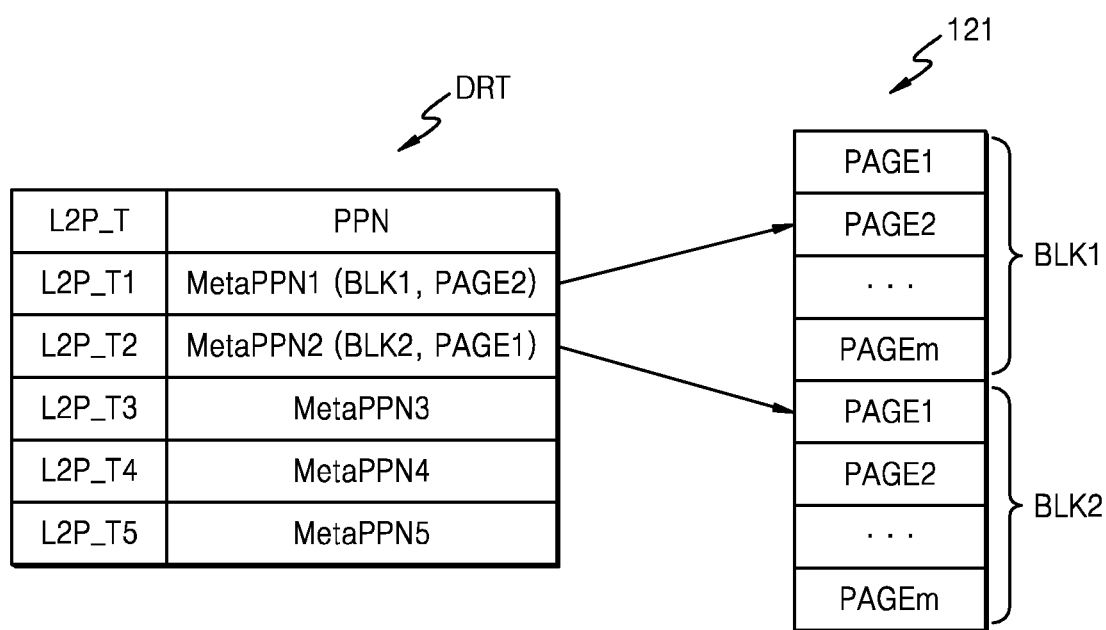
FIG. 25 is a diagram of a directory according to an exemplary embodiment of the inventive concept.

FIG. 25 is a diagram of a directory DRT according to an exemplary embodiment of the inventive concept.

Referring to FIG. 25, the directory DRT may include first through fifth meta physical addresses MetaPPN1 through MetaPPN5 at which the first through fifth L2P mapping tables L2P_T1 through L2P_T5 are respectively stored in the meta area 121 of the NVM 120. The first through fifth meta physical addresses MetaPPN1 through MetaPPN5 may be referred to as first through fifth directory data. For example, the second L2P mapping table L2P_T2 may be stored at the second meta physical address MetaPPN2 of the meta area 121 and the second meta physical address MetaPPN2 may correspond to the first page PAGE1 of the second block BLK2 of the meta area 121.

Figure 26:
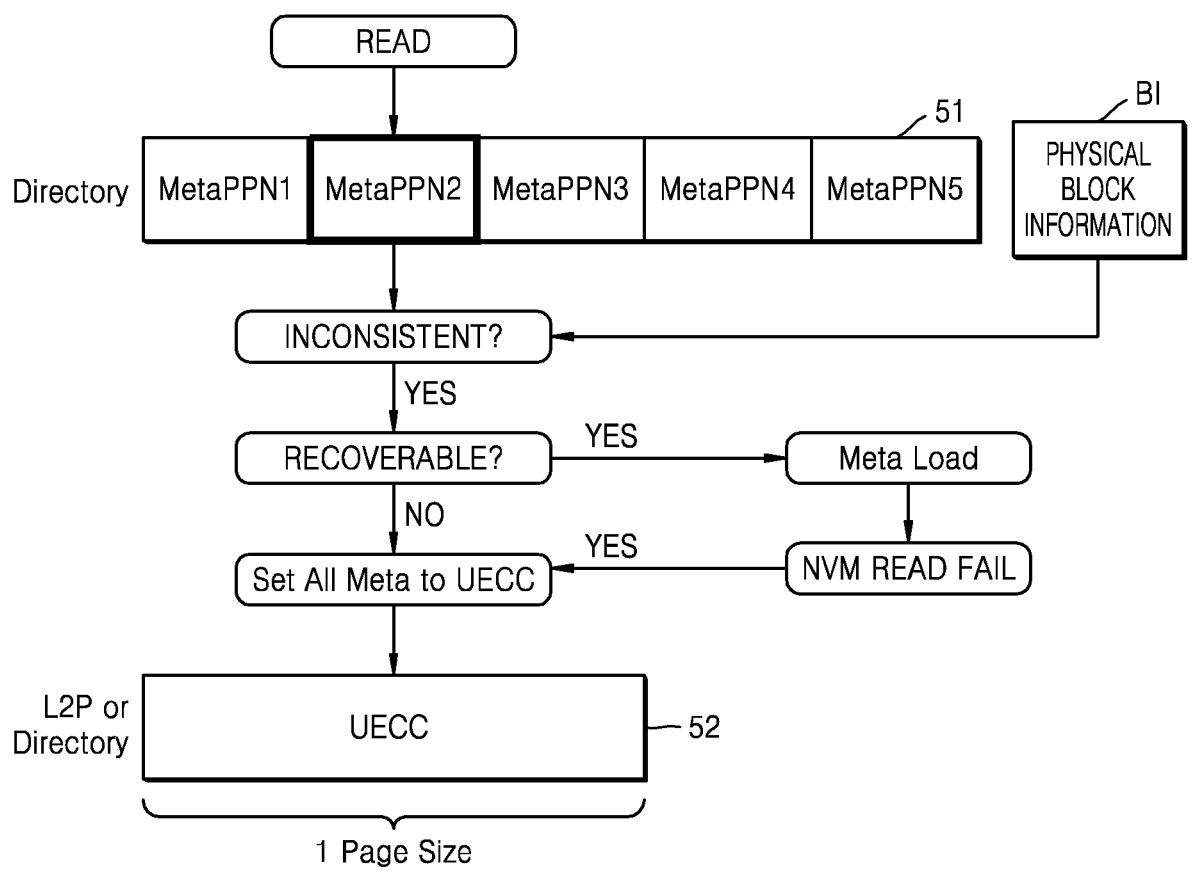
FIG. 26 is a diagram of a UECC processing operation performed on a directory, according to an exemplary embodiment of the inventive concept.

FIG. 26 is a diagram of a UECC processing operation performed on a directory according to an exemplary embodiment of the inventive concept.

Referring to FIGS. 22, 25, and 26, a directory 51 loaded to a volatile memory (e.g., DRAM) of a storage device may include first through fifth directory data, which may respectively correspond to the first through fifth meta physical addresses MetaPPN1 through MetaPPN5.

The UECC processing module 111a may determine whether the first through fifth directory data are corrupted based on the physical block information BI stored in the physical block information area 112b. For example, the UECC processing module 111a may determine whether the second directory data is consistent with the physical block information BI. When the second directory data is inconsistent with the physical block information BI, the UECC processing module 111a may determine whether the second directory data is recoverable.

When it is determined that the second directory data is recoverable, the UECC processing module 111a may recover the second directory data and may load the second L2P mapping table L2P_T2 from the meta area 121 to the DRAM according to the second directory data. In an embodiment, the second directory data is recoverable when a backup copy of the second directory data is present. When an operation of reading the second L2P mapping table L2P_T2 from the meta area 121 fails and the second L2P mapping table L2P_T2 is not loaded to the DRAM, all mapping data included in the second L2P mapping table L2P_T2 is processed as UECC errors.

For example, the second L2P mapping table L2P_T2 may be stored at the second meta physical address MetaPPN2 corresponding to the second directory data. At this time, since the second directory data is processed as a UECC error, the second L2P mapping table L2P_T2 corresponding to a one page size may be processed as a UECC error. Accordingly, when a read request with respect to a logical address included in the second L2P mapping table L2P_T2 is received from a host, the storage device may provide an error message to the host indicating that reading is impossible with respect to the read request.

Figure 27:
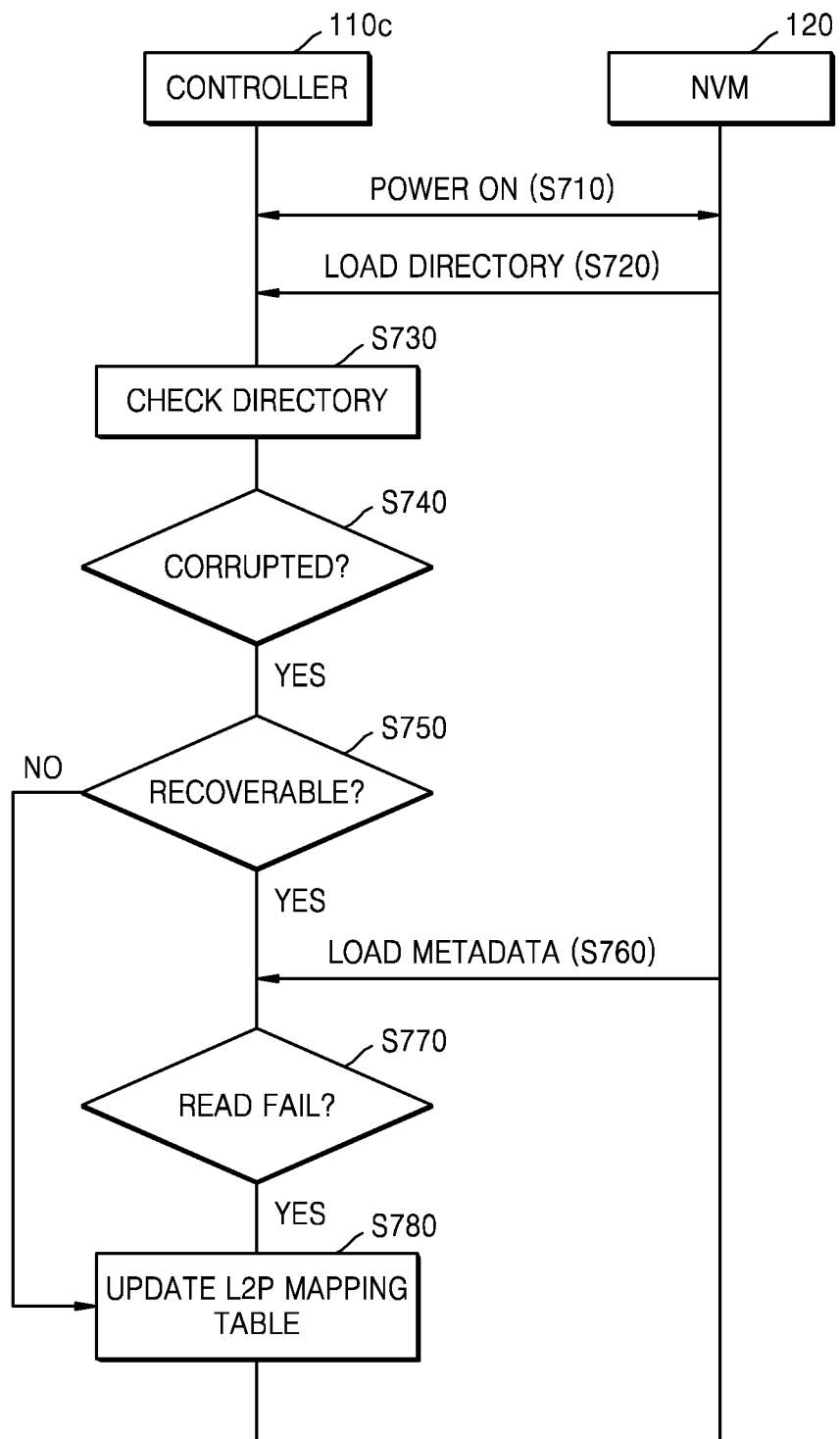
FIG. 27 is a flowchart of operations performed between a controller and a non-volatile memory in the UECC processing operation illustrated in FIG. 26, according to an exemplary embodiment of the inventive concept.

FIG. 27 is a flowchart of operations performed between the controller 110c and the NVM 120 in the UECC processing operation illustrated in FIG. 26 according to an exemplary embodiment of the inventive concept. The controller 110c may correspond to the controller 110c shown in FIG. 22 and the NVM 120 may correspond to the NVM 120 shown in FIG. 1. FIGS. 22 and 27 are referred to in the description below.

Power is supplied to the storage device 100 in operation S710. The NVM 120 transmits a directory to the controller 110c, and therefore, the directory is loaded to the memory MEMc in the controller 110c in operation S720. The controller 110c checks the directory loaded to the memory MEMc in operation S730. The controller 110c determines whether a plurality of directory data included in the directory are corrupted in operation S740. The controller 110c determines whether corrupted directory data is recoverable in operation S750. When it is determined that the corrupted directory data is recoverable, operation S760 is performed. When it is determined that the corrupted directory data is unrecoverable, operation S780 is performed. The NVM 120 transmits metadata to the controller 110c in operation S760. The controller 110c determines whether a read fails in operation S770. The read may be based on the transmitted metadata. When it is determined that the read fails, operation S780 is performed. The controller 110c updates a mapping table stored in the mapping table area 112a of the memory MEMc in operation S780.

Figure 28:
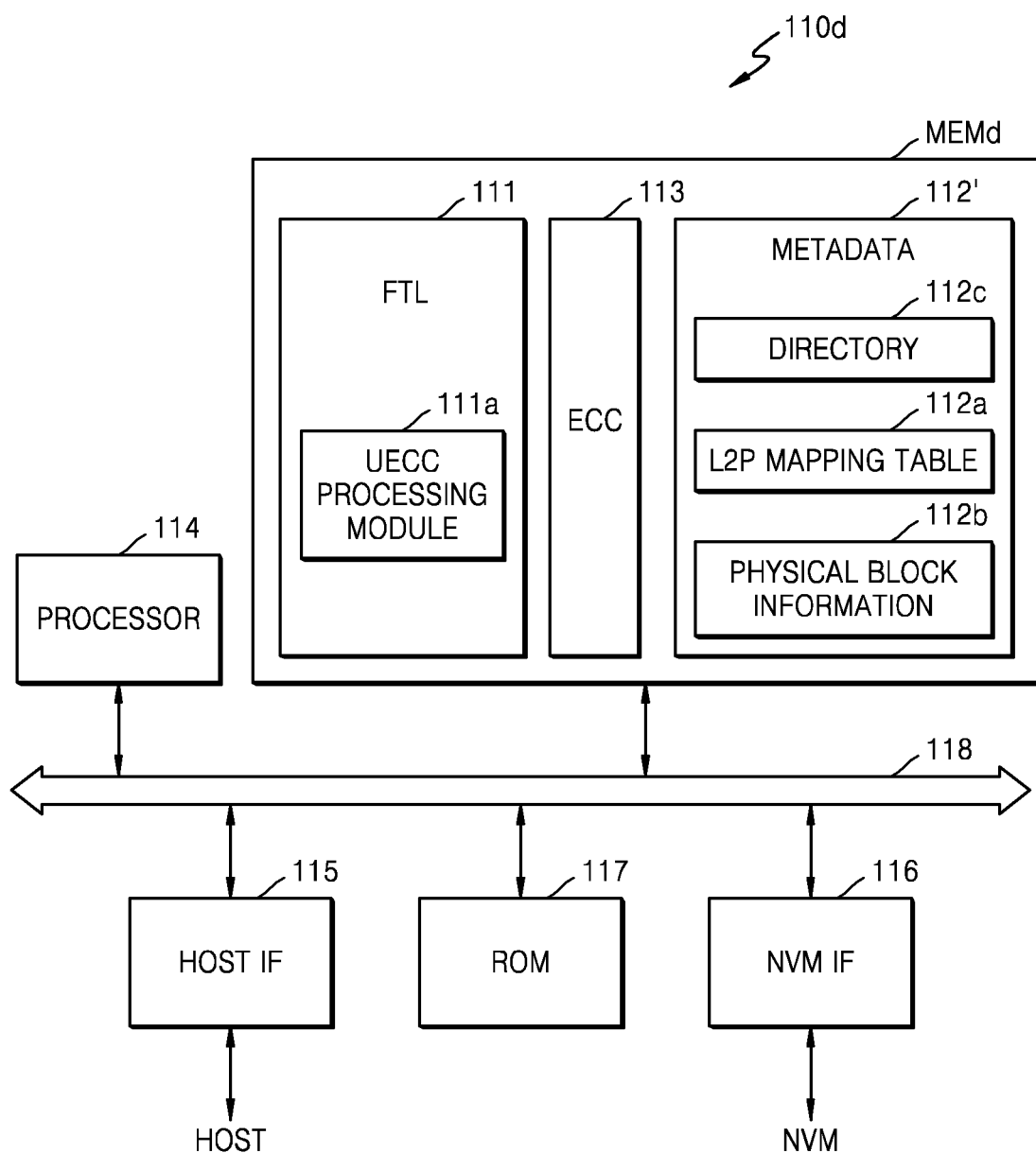
FIG. 28 is a block diagram of a controller according to an exemplary embodiment of the inventive concept.

FIG. 28 is a block diagram of a controller 110d according to an exemplary embodiment of the inventive concept.

Referring to FIG. 28, the controller 110d is a modification of the controller 110b shown in FIG. 13. Thus redundant descriptions thereof will be omitted. Unlike the metadata area 112 shown in FIG. 2, the metadata area 112' further includes the directory area 112c which stores a directory. The directory area 112c may substantially be the same as the directory area 112c shown in FIG. 22. Thus redundant descriptions thereof will be omitted.

A memory MEMd includes the ECC module 113. The ECC module 113 may perform an ECC operation on data stored in the metadata area 112'. In an embodiment, the ECC module 113 performs an ECC operation on directory data loaded to the directory area 112c. The ECC module 113 may also perform an ECC operation on mapping data loaded to the L2P mapping table area 112a and physical block information loaded to the physical block information area 112b.

Figure 29:
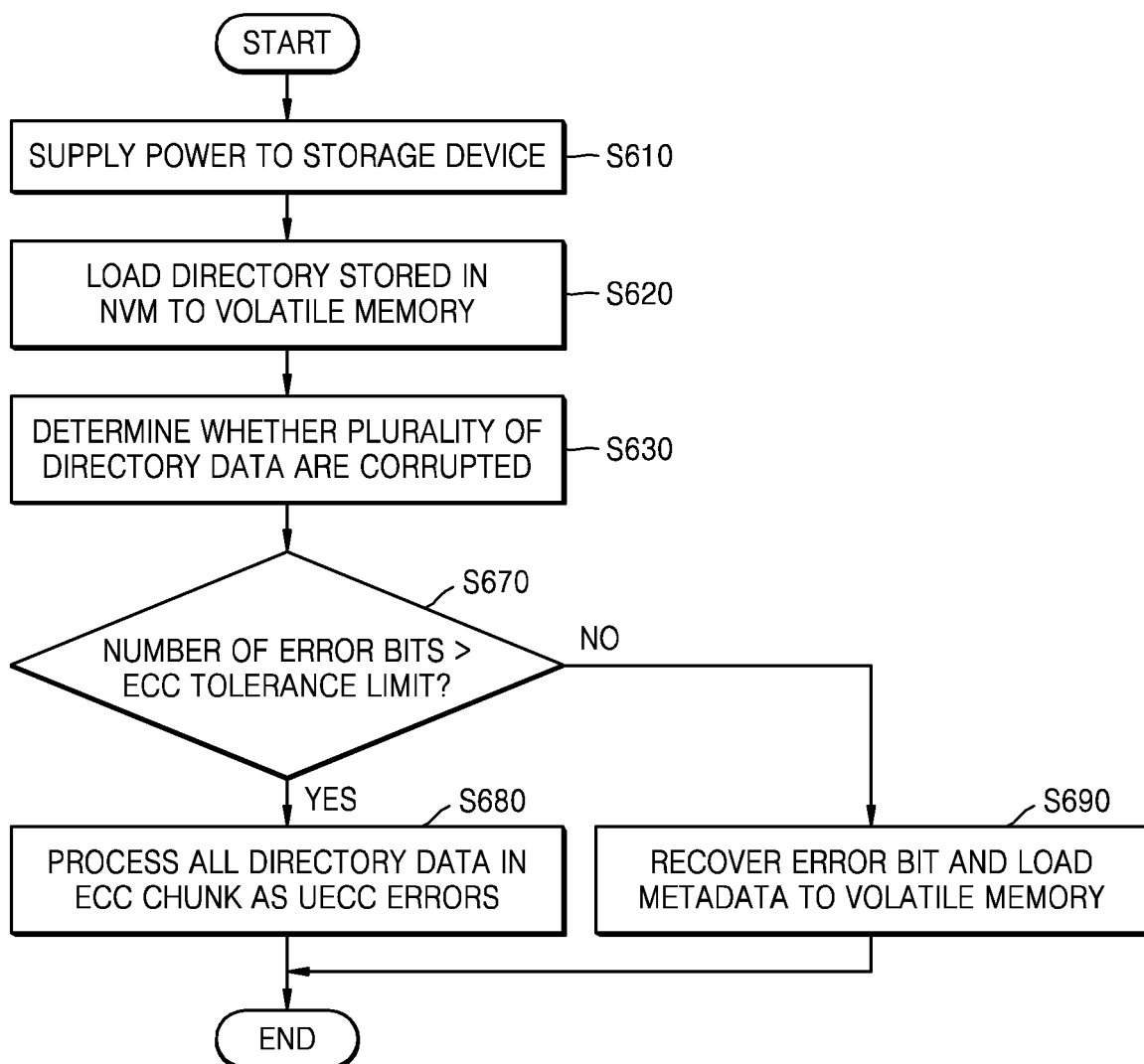
FIG. 29 is a flowchart of a method of operating a storage device, according to an embodiment of the inventive concept.

FIG. 29 is a flowchart of a method of operating a storage device according to an exemplary embodiment of the inventive concept.

Referring to FIG. 29, the method of operating a storage device relates to a method of processing corrupted directory data and may include operations time-sequentially performed in, for example, the storage device 100' shown in FIG. 12 and the controller 110d shown in FIG. 28. The method of operating the storage device 100' will be described with reference to FIGS. 12, 28, and 29 below.

Power is supplied to the storage device 100' in operation S610. A directory stored in the NVM 120 is loaded to the volatile memory MEMd in operation S620. In an embodiment, the directory stored in the meta area 121 of the NVM 120 is loaded to the directory area 112c of the volatile memory MEMd. Whether a plurality of directory data are corrupted is determined in operation S630. Whether the number of error bits exceeds an ECC tolerance limit is determined in operation S670. When it is determined that the number of error bits exceeds the ECC tolerance limit, operation S680 is performed. When it is determined that the number of error bits does not exceed the ECC tolerance limit, operation S690 is performed. All directory data included in an ECC chunk are processed as UECC errors in operation S680. An error bit is recovered and metadata is loaded to the volatile memory MEMd in operation S690.

Figure 30:
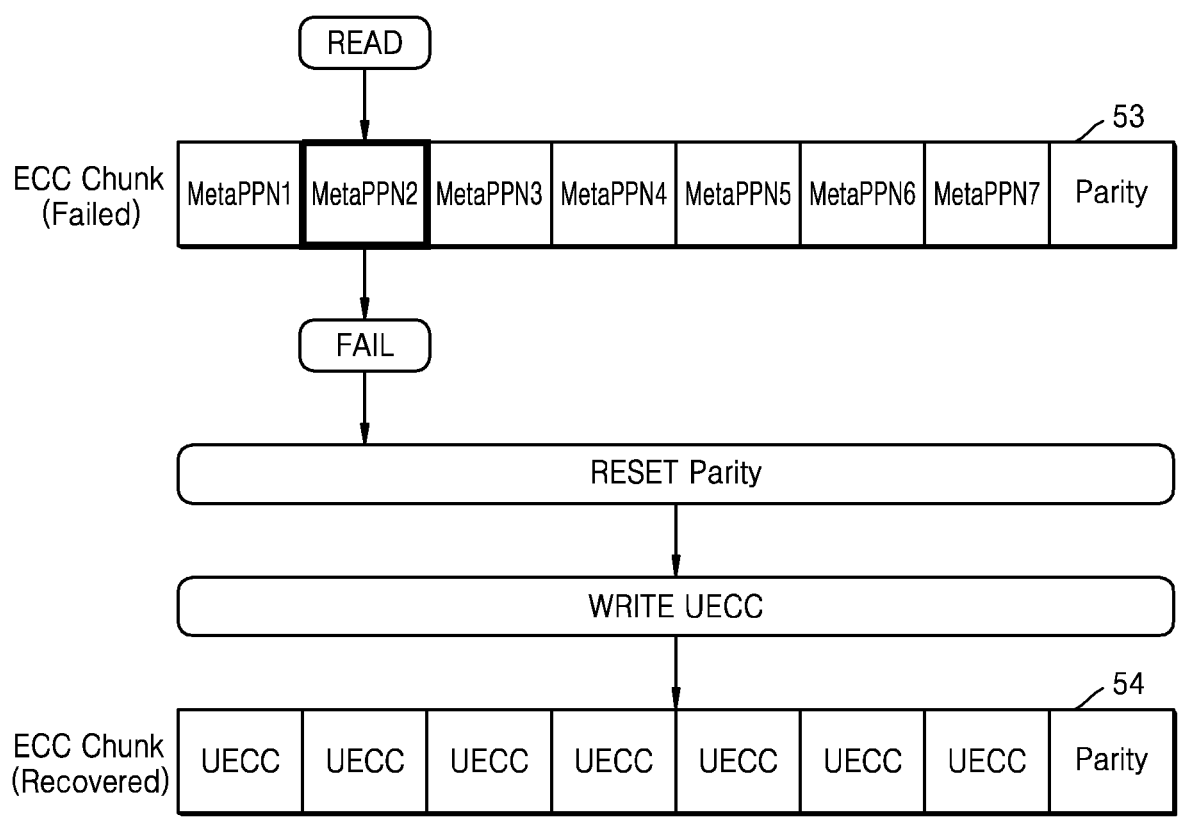
FIG. 30 is a diagram of a UECC processing operation performed on a directory, according to an exemplary embodiment of the inventive concept.

FIG. 30 is a diagram of a UECC processing operation performed on a directory according to an exemplary embodiment of the inventive concept.

Referring to FIGS. 28 and 30, a first ECC chunk 53 may be stored in the volatile memory MEMd of a storage device. The volatile memory MEMd may be DRAM. The first ECC chunk 53 may include a plurality of directory data MetaPPN1 through MetaPPN7 and parity. The size of each directory data may be 4 bytes and the size of the first ECC chunk 53 may be 32 bytes, but the inventive concept is not limited thereto. For example, the directory data MetaPPN2 may have error bits exceeding an ECC tolerance limit.

The ECC module 113 may detect error bits in the first ECC chunk 53 by checking the parity and correct error bits within the ECC tolerance limit. However, when the number of error bits detected exceeds the ECC tolerance limit, the ECC module 113 cannot correct the error bits. Accordingly, the metadata processing module MDP may determine that all directory data MetaPPN1 through MetaPPN7 included in the first ECC chunk 53 are unrecoverable directory data.

The metadata processing module MDP may reset the parity according to the current state of the directory data MetaPPN1 through MetaPPN7 included in the first ECC chunk 53 and process all directory data MetaPPN1 through MetaPPN7 as UECC errors, thereby correcting the first ECC chunk 53 into a second ECC chunk 54. After the correcting, a UECC write operation may be performed for UECC error processing. The UECC write operation may be performed on an NVM of the storage device. Alternatively, the UECC write operation may be performed on the volatile memory MEMd of the storage device.

When a logical address received together with a read request from a host corresponds to mapping data included in a mapping table corresponding to one of a plurality of directory data included in the second ECC chunk 54, the storage device may provide an error message to the host indicating that reading is impossible with respect to the read request.

According to an embodiment of the inventive concept, since all of first through seventh directory data are processed as UECC errors, first through seventh L2P mapping tables respectively stored at first through seventh meta physical addresses MetaPPN1 through MetaPPN7 are all processed as UECC errors. For example, all of the first through seventh L2P mapping tables which correspond to a size of seven pages may be processed as UECC errors. Accordingly, all mapping data included in each of the first through seventh L2P mapping tables are processed as UECC errors. For example, when a read request with respect to a logical address included in one of the first through seventh L2P mapping tables respectively stored at the first through seventh meta physical addresses MetaPPN1 through MetaPPN7 is received from a host, a storage device may provide an error message to the host indicating that reading is impossible with respect to the read request.

Figure 31:
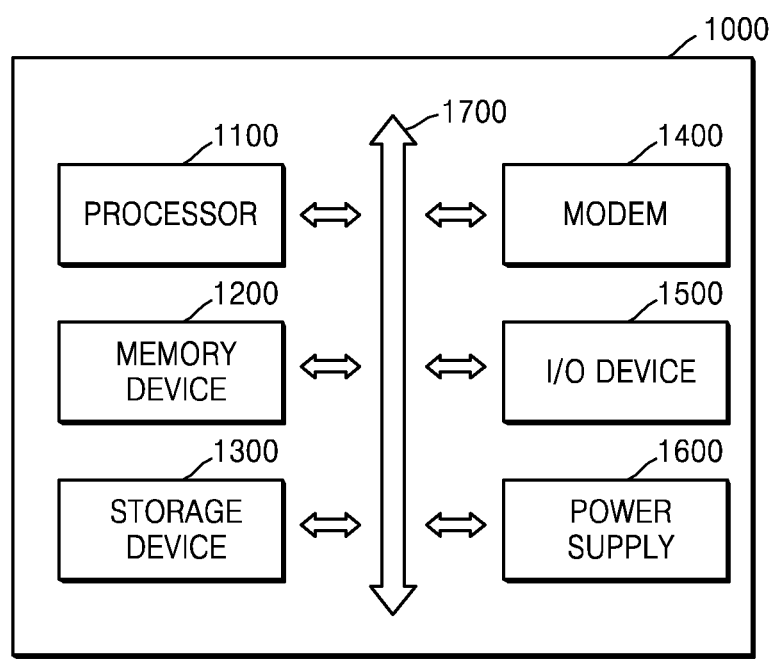
FIG. 31 is a block diagram of an electronic device according to an exemplary embodiment of the inventive concept.

FIG. 31 is a block diagram of an electronic device 1000 according to an exemplary embodiment of the inventive concept.

Referring to FIG. 31, the electronic device 1000 includes a processor 1100, a memory device 1200, a storage device 1300, a modem 1400, an input/output (I/O) device 1500, and a power supply 1600. When the storage device 1300 receives a read request related to unrecoverable metadata, the storage device 1300 may process the metadata as an uncorrectable error. Thereafter, when the storage device 1300 receives a read or write request related to metadata which is not corrupted or which is recoverable, the storage device 1300 performs a read operation according to the read request or performs a write operation according to the write request. Consequently, the storage device 1300 may continuously provide normal services.

While the inventive concept has been particularly shown and described with reference to embodiments thereof, it will be understood that various changes in form and details may be made therein without departing from the spirit and scope of the inventive concept.

What is claimed is:

1. A method of operating a storage device including a non-volatile memory and a volatile memory, the method comprising:
   receiving a first logical address from a host;
   determining whether first metadata stored in the volatile memory and associated with the first logical address is corrupted;
   processing the first metadata as an uncorrectable error when the first metadata is determined to be corrupted;
   providing an error message to the host indicating that an operation cannot be performed on data associated with the first logical address when the first metadata is processed as the uncorrectable error;
   after the providing of the error message, receiving a second logical address from the host;
   determining whether second metadata stored in the volatile memory and associated with the second logical address is corrupted; and
   performing an operation of accessing the non-volatile memory based on the second metadata, when the second metadata is not determined to be corrupted.

2. The method of claim 1, wherein the first metadata comprises mapping data indicating a first physical address corresponding to the first logical address; and
   the processing of the first metadata comprises processing the mapping data as the uncorrectable error, when the mapping data is unrecoverable.

3. The method of claim 2, wherein the determining of whether the first metadata is corrupted comprises determining whether the mapping data is corrupted based on physical block information stored in the volatile memory.

4. The method of claim 2, wherein the processing of the first metadata further comprises correcting the first physical address into a second physical address.

5. The method of claim 4, wherein the second physical address corresponds to a signature indicating a physical address which does not exist in the non-volatile memory, and
   the providing of the error message comprises providing the error message to the host according to the signature without accessing the non-volatile memory.

6. The method of claim 4, wherein the second physical address corresponds to a new physical address for storing data indicating the uncorrectable error in the non-volatile memory, and the processing of the first metadata further comprises writing the data to the second physical address.

7. The method of claim 1, wherein the first metadata comprises trim data indicating data erased from the host; and
   the processing of the first metadata comprises processing mapping data corresponding to the trim data as the uncorrectable error, when the trim data is unrecoverable.

8. The method of claim 1, wherein the volatile memory comprises an error checking and correction (ECC) module; and
   the processing of the first metadata comprises processing the first metadata as the uncorrectable error, when the first metadata cannot be corrected by the ECC module.

9. The method of claim 8, wherein the first metadata comprises mapping data indicating a first physical address corresponding to the first logical address, and
   the processing of the first metadata comprises processing all mapping data, which is included in an ECC chunk having the mapping data, as the uncorrectable error.

10. The method of claim 9, wherein the processing of all the mapping data comprises:
    resetting parity of the ECC chunk according to all the mapping data included in the ECC chunk; and
    changing physical addresses of all the mapping data included in the ECC chunk into corrected physical addresses.

11. The method of claim 8, wherein the first metadata comprises mapping data indicating a first physical address corresponding to the first logical address and trim data indicating data erased from the host, and
    the processing of the first metadata comprises processing a plurality of mapping ECC chunks corresponding to the trim data as the uncorrectable error.

12. A method of operating a storage device including a non-volatile memory and a volatile memory, the method comprising:
    loading a directory stored in the non-volatile memory to the volatile memory when power is supplied to the storage device, wherein the directory includes a plurality of directory data indicating physical addresses respectively corresponding to a plurality of metadata;
    determining whether the plurality of directory data is corrupted in the directory loaded to the volatile memory;
    determining whether first directory data among the plurality of directory data determined to be corrupted is recoverable;
    processing first metadata corresponding to the first directory data as an uncorrectable error when the first directory data is corrupted and not recoverable; and
    loading second metadata corresponding to second directory data from the non-volatile memory to the volatile memory, wherein the second directory data is not corrupted among the plurality of directory data.

13. The method of claim 12, further comprising:
    receiving a logical address from a host;
    providing an error message to the host indicating that an operation cannot be performed on data associated with the logical address, when the logical address corresponds to the first metadata; and
    performing the operation when the logical address corresponds to the second metadata.

14. The method of claim 12, wherein the volatile memory comprises an error checking and correction (ECC) module, and
    the processing of the first metadata comprises processing the first directory data as the uncorrectable error, when the first directory data cannot be corrected by the ECC module.

15. The method of claim 14, wherein the processing of the first directory data comprises:
    processing all directory data, which is included in an ECC chunk having the first directory data, as the uncorrectable error; and
    processing a plurality of metadata corresponding to all the directory data as the uncorrectable error.

16. The method of claim 12, further comprising loading the plurality of metadata stored in the non-volatile memory to the volatile memory,
wherein the plurality of metadata comprises at least one of mapping data indicating a physical address corresponding to a logical address, physical block information indicating information about pages of each physical block comprised in the non-volatile memory, or trim data indicating data erased from a host.

17. A storage device comprising:
a non-volatile memory; and
a controller comprising a volatile memory configured to store first metadata associated with a first logical address and second metadata associated with a second logical address,
wherein, when the controller receives the first logical address from a host, the controller is configured to determine whether the first metadata is corrupted and process the first metadata as an uncorrectable error if the first metadata is corrupted, and
then, when the controller receives the second logical address from the host, the controller is configured to determine whether the second metadata is corrupted and control an operation of accessing the non-volatile memory based on the second metadata if the second metadata is not corrupted.

18. The storage device of claim 17, wherein the first and second metadata comprise at least one of mapping data indicating a physical address corresponding to a logical address, physical block information indicating information about pages of each physical block comprised in the non-volatile memory, or trim data indicating data erased from a host.

19. The storage device of claim 17, wherein the volatile memory comprises an error checking and correction (ECC) module, and
when the first metadata is corrupted and cannot be corrected by the ECC module, the controller is further configured to process all metadata, which is included in an ECC chunk having the first metadata, as the uncorrectable error.

20. The storage device of claim 17, wherein the volatile memory is further configured to store a directory indicating physical addresses respectively corresponding to the first and second metadata, and
the controller is further configured to determine whether a plurality of directory data included in the directory is corrupted and process metadata, which corresponds to first directory data which is corrupted among the plurality of directory data, as the uncorrectable error.

* * * * *